United States Patent
Saito et al.

(10) Patent No.: US 11,791,672 B2
(45) Date of Patent: Oct. 17, 2023

(54) CORE, STATOR, AND ROTATING ELECTRIC MACHINE

(71) Applicants: SUMITOMO ELECTRIC INDUSTRIES, LTD., Osaka (JP); Sumitomo Electric Sintered Alloy, Ltd., Takahashi (JP)

(72) Inventors: Tatsuya Saito, Osaka (JP); Tomoyuki Ueno, Osaka (JP); Yuka Fukunaga, Osaka (JP); Hijiri Tsuruta, Takahashi (JP); Shinichi Hirono, Takahashi (JP)

(73) Assignees: SUMITOMO ELECTRIC INDUSTRIES, LTD., Osaka (JP); Sumitomo Electric Sintered Alloy, Ltd., Takahashi (JP)

( * ) Notice: Subject to any disclaimer, the term of this patent is extended or adjusted under 35 U.S.C. 154(b) by 268 days.

(21) Appl. No.: 17/414,871

(22) PCT Filed: Dec. 13, 2019

(86) PCT No.: PCT/JP2019/049064
§ 371 (c)(1),
(2) Date: Jun. 16, 2021

(87) PCT Pub. No.: WO2020/129866
PCT Pub. Date: Jun. 25, 2020

(65) Prior Publication Data
US 2022/0060066 A1    Feb. 24, 2022

(30) Foreign Application Priority Data
Dec. 18, 2018 (JP) .................................. 2018-236767

(51) Int. Cl.
*H02K 1/14* (2006.01)

(52) U.S. Cl.
CPC ......... *H02K 1/148* (2013.01); *H02K 2213/03* (2013.01)

(58) Field of Classification Search
CPC ............ H02K 1/148; H02K 1/12; H02K 1/02; H02K 1/146; H02K 1/27; H02K 1/06;
(Continued)

(56) References Cited

U.S. PATENT DOCUMENTS 6,069,431 A * 5/2000 Satoh ........................ H02K 1/02
310/43
7,323,799 B2 * 1/2008 Naito ...................... H02K 1/148
310/216.077
(Continued)

FOREIGN PATENT DOCUMENTS

JP      H04-33534 A    2/1992
JP      H05-219666 A   8/1993
(Continued)

*Primary Examiner* — Maged M Almawri
(74) *Attorney, Agent, or Firm* — Faegre Drinker Biddle & Reath LLP

(57) ABSTRACT

A core for use in an axial gap rotating electric machine, the core including: a yoke having an annular plate shape; and a plurality of teeth having a columnar shape arranged at intervals in a circumferential direction of the yoke, wherein the yoke has: an outer-circumferential face; an inner-circumferential face; a first face having a flat shape connecting the outer-circumferential face and the inner-circumferential face to each other; and a plurality of recessed portions connected to the first face, each of the plurality of teeth has an outer-circumferential face protruding in an axial direction of the yoke with respect to the first face, each of the plurality of recessed portions are connected to at least a portion of each one of the plurality of teeth in a circumferential direction of the outer-circumferential face, all shortest distances between at least one of an outer-circumferential edge of the first face and an inner-circumferential edge of the first (Continued)

face and the outer-circumferential faces of the plurality of teeth are 4 mm or less, and the yoke and the plurality of teeth are made of an integrally-molded powder compact.

12 Claims, 10 Drawing Sheets

(58) Field of Classification Search
CPC ...... H02K 1/17; H02K 1/276; H02K 2203/12; H02K 2203/15; H02K 2213/03
USPC .......... 310/44, 43, 45, 179, 208, 42, 154.11, 310/156.53, 156.57, 216.067, 259, 258, 310/254
See application file for complete search history.

(56) References Cited

U.S. PATENT DOCUMENTS

| | | | | |
|---|---|---|---|---|
| 7,528,521 B2* | 5/2009 | Naitou | ................ | H02K 1/2795 |
| | | | | 310/268 |
| 8,373,326 B2* | 2/2013 | Enomoto | ............... | H02K 1/148 |
| | | | | 310/216.046 |
| 10,177,631 B1* | 1/2019 | Hopkins | ................ | H02K 3/325 |
| 10,763,716 B2* | 9/2020 | Tokoi | ..................... | H02K 3/524 |
| 10,848,016 B2* | 11/2020 | Shiohara | ................ | H02K 1/146 |
| 10,903,729 B1* | 1/2021 | Cunnyngham | ........ | H02K 1/265 |
| 11,146,123 B2* | 10/2021 | Caamaño | ................ | H02K 1/185 |
| 11,165,312 B2* | 11/2021 | Tokoi | ....................... | H02K 1/20 |
| 11,205,935 B2* | 12/2021 | Enomoto | ............ | H02K 1/2795 |
| 11,296,572 B1* | 4/2022 | Kislev | ..................... | H02K 1/14 |
| 11,309,762 B2* | 4/2022 | Hong | ...................... | H02K 3/34 |
| 2003/0057796 A1* | 3/2003 | Fan | .......................... | H02K 1/02 |
| | | | | 310/216.062 |
| 2004/0212256 A1* | 10/2004 | Sugishima | ............. | H02K 3/487 |
| | | | | 29/598 |
| 2005/0073213 A1* | 4/2005 | Naito | ..................... | H02K 1/148 |
| | | | | 310/156.32 |
| 2006/0043821 A1* | 3/2006 | Kojima | ................. | H02K 21/24 |
| | | | | 310/268 |
| 2010/0156204 A1* | 6/2010 | Endo | ..................... | H02K 3/522 |
| | | | | 310/216.069 |
| 2010/0187934 A1* | 7/2010 | Asano | .................. | H02K 1/2795 |
| | | | | 310/156.32 |
| 2011/0095628 A1* | 4/2011 | Enomoto | ............... | H02K 1/148 |
| | | | | 310/44 |
| 2011/0221297 A1* | 9/2011 | Langford | ............... | H02K 3/345 |
| | | | | 310/215 |
| 2011/0309726 A1* | 12/2011 | Carpenter | .............. | H02K 21/24 |
| | | | | 310/75 R |
| 2012/0235530 A1* | 9/2012 | Moya | ..................... | H02K 21/24 |
| | | | | 310/156.01 |
| 2012/0262022 A1* | 10/2012 | Takemoto | ............ | H02K 1/2796 |
| | | | | 310/156.35 |
| 2013/0009508 A1* | 1/2013 | Takamatsu | ........... | H02K 1/2796 |
| | | | | 310/156.32 |
| 2013/0278103 A1* | 10/2013 | McPherson | ............ | H02K 15/02 |
| | | | | 310/154.02 |
| 2014/0015358 A1* | 1/2014 | Wan | ........................ | H02K 3/522 |
| | | | | 310/198 |
| 2014/0070659 A1* | 3/2014 | Lee | ........................... | H02K 1/02 |
| | | | | 310/216.104 |
| 2014/0103777 A1* | 4/2014 | Santos | .................. | H02K 15/022 |
| | | | | 310/254.1 |
| 2014/0265653 A1* | 9/2014 | Heins | ..................... | H02K 1/143 |
| | | | | 310/198 |
| 2015/0303745 A1* | 10/2015 | Matsumoto | ............ | H02K 3/521 |
| | | | | 310/43 |
| 2015/0349588 A1* | 12/2015 | Tokoi | ....................... | H02K 3/34 |
| | | | | 310/208 |
| 2016/0065020 A1* | 3/2016 | Tokoi | .................... | H02K 1/2795 |
| | | | | 310/156.08 |
| 2017/0025927 A1* | 1/2017 | Weerts | ...................... | H02K 3/24 |
| 2017/0244293 A1* | 8/2017 | Kanda | ...................... | H02K 1/02 |
| 2017/0250580 A1* | 8/2017 | Rhyu | ........................ | H02K 1/12 |
| 2018/0219442 A1* | 8/2018 | Heins | ................... | H02K 1/2796 |
| 2019/0214860 A1 | 7/2019 | Igarashi et al. | | |
| 2019/0288584 A1* | 9/2019 | Vansompel | ............ | H02K 9/227 |
| 2020/0067357 A1* | 2/2020 | Post | ........................ | H02K 21/24 |
| 2021/0028663 A1* | 1/2021 | Hong | ....................... | H02K 3/18 |
| 2021/0152040 A1* | 5/2021 | Yao | ........................ | H02K 3/521 |
| 2021/0288569 A1* | 9/2021 | Yao | ........................ | H02K 1/2798 |
| 2021/0384778 A1* | 12/2021 | Saito | ..................... | H02K 1/146 |
| 2022/0271578 A1* | 8/2022 | Horiuchi | ................ | B33Y 80/00 |

FOREIGN PATENT DOCUMENTS

| | | |
|---|---|---|
| JP | 2009-291003 A | 12/2009 |
| JP | 2010-011669 A | 1/2010 |
| JP | 2012-139027 A | 7/2012 |
| JP | 6228633 B1 | 11/2017 |

\* cited by examiner

CORE, STATOR, AND ROTATING ELECTRIC MACHINE

TECHNICAL FIELD

The present disclosure relates to a core, a stator, and a rotating electric machine.

The present application claims priority based on Japanese Patent Application No. 2018-236767 filed Dec. 18, 2018, the entire description of which is incorporated herein by reference.

BACKGROUND ART

A dust core disclosed in Patent Document 1 is known as a core used in an axial gap rotating electric machine. The dust core in Patent Document 1 has a fan-shaped yoke portion and tooth portions that protrude from the yoke portion. The yoke portion and the tooth portions are integrally molded. The distance between an outer-circumferential edge of the yoke portion and each tooth portion is the same as the distance between an inner-circumferential edge of the yoke portion and each tooth portion.

CITATION LIST

Patent Documents

Patent Document 1: JP 2017-229191A

SUMMARY OF INVENTION

A core according to the present disclosure is a core for use in an axial gap rotating electric machine, the core including:
 a yoke having an annular plate shape; and
 a plurality of teeth having a columnar shape arranged at intervals in a circumferential direction of the yoke,
  wherein the yoke has:
  an outer-circumferential face;
  an inner-circumferential face;
  a first face having a flat shape connecting the outer-circumferential face and the inner-circumferential face to each other; and
  a plurality of recessed portions connected to the first face,
  each of the plurality of teeth has an outer-circumferential face protruding in an axial direction of the yoke with respect to the first face,
  each of the plurality of recessed portions are connected to at least a portion of each one of the plurality of teeth in a circumferential direction of the outer-circumferential face,
  all shortest distances between at least one of an outer-circumferential edge of the first face and an inner-circumferential edge of the first face and the outer-circumferential faces of the plurality of teeth are 4 mm or less, and
  the yoke and the plurality of teeth are made of an integrally-molded powder compact.

A stator according the present disclosure is
 a stator of an axial gap rotating electric machine, the stator including:
 the core according to the present disclosure; and
 a coil arranged on each of the plurality of teeth of the core.

A rotating electric machine according to the present disclosure is
 an axial gap rotating electric machine that includes a rotor and a stator, the rotor and the stator being arranged opposite to each other in an axial direction,
 wherein the stator is the stator according to the present disclosure.

DESCRIPTION OF EMBODIMENTS

Figure 1:
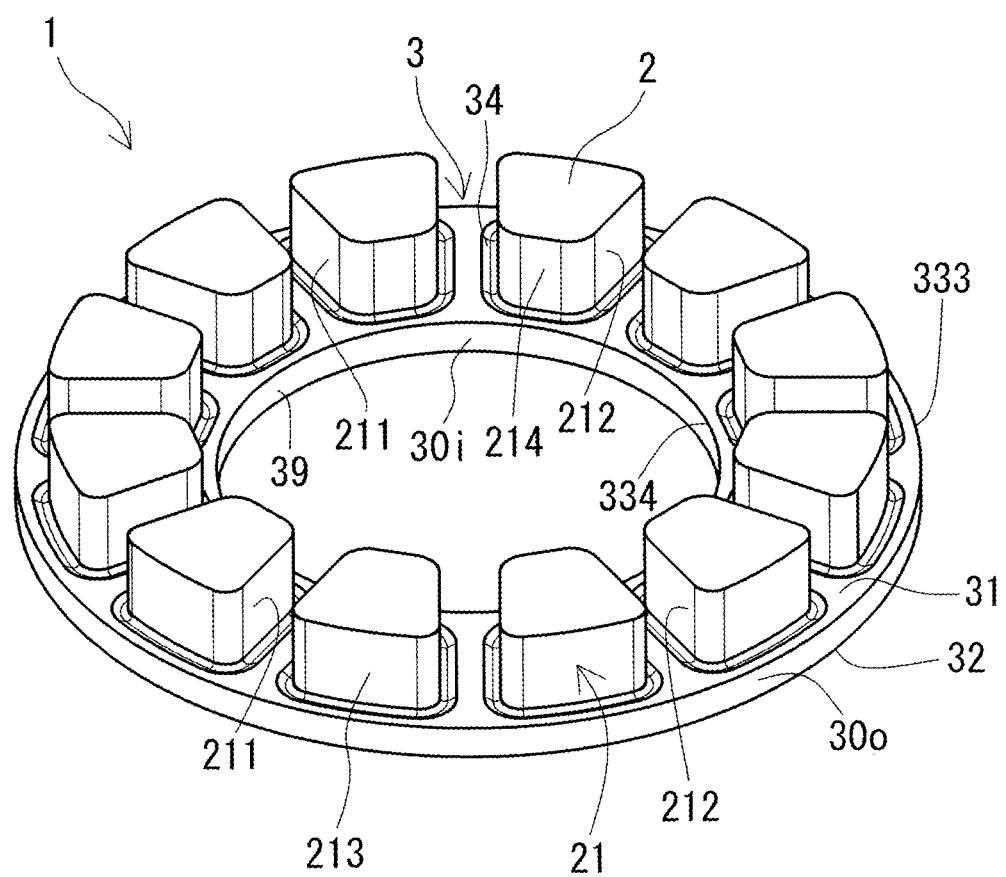
FIG. 1 is a perspective view showing a schematic sketch of a core according to Embodiment 1.

Problem to be Solved by the Present Disclosure

A high-density core with a large proportion of the size of teeth to the size of a yoke is desired. However, an optimal shape and manufacturing method of such a core have not been sufficiently examined.

An object of the present disclosure is to provide a core that has a high density and a large proportion of the size of teeth to the size of a yoke, and has excellent productivity.

Also, an object of the present disclosure is to provide a stator that makes it possible to construct a rotating electric machine that has excellent magnetic characteristics and productivity.

Furthermore, an object of the present disclosure is to provide a rotating electric machine that has excellent magnetic characteristics and productivity.

Effects of the Present Disclosure

The core according to the present disclosure has a high density and a large proportion of the size of the teeth to the size of the yoke, and has excellent productivity.

The stator according to the present disclosure makes it possible to construct a rotating electric machine that has excellent magnetic characteristics and productivity.

The rotating electric machine according to the present disclosure has excellent magnetic characteristics and productivity.

Description of Embodiments of the Present Disclosure

Firstly, the embodiments of the present disclosure will be listed.

(1) A core according to one aspect of the present disclosure is a core for use in an axial gap rotating electric machine, the core including:

a yoke having an annular plate shape; and a plurality of teeth having a columnar shape arranged at intervals in a circumferential direction of the yoke, wherein the yoke has:

an outer-circumferential face;

an inner-circumferential face;

a first face having a flat shape connecting the outer-circumferential face and the inner-circumferential face to each other; and a plurality of recessed portions connected to the first face, each of the plurality of teeth has an outer-circumferential face protruding in an axial direction of the yoke with respect to the first face, each of the plurality of recessed portions are connected to at least a portion of each one of the plurality of teeth in a circumferential direction of the outer-circumferential face, all shortest distances between at least one of an outer-circumferential edge of the first face and an inner-circumferential edge of the first face and the outer-circumferential faces of the plurality of teeth are 4 mm or less, and the yoke and the plurality of teeth are made of an integrally-molded powder compact.

In the above core, the proportion of the size of the teeth to the size of the yoke is large. This is because the shortest distances satisfy the range.

The above core has a high density and has excellent productivity. This is because the annular plate-shaped yoke and the plurality of columnar teeth are integrated, and, as a result of forming the recessed portions together when manufacturing a core with the shortest distances satisfying the aforementioned range using a mold by means of compression molding, the mold is unlikely to be damaged even if the molding pressure is increased. As will be described later in detail, these recessed portions are formed due to the shape of protruding portions on end faces of punches being transferred during compression molding. When these punches compress a material powder of the core, deformation of the punches is suppressed by the anchor effect obtained due to the protruding portions proceeding into the material powder. For this reason, even if the molding pressure is increased in order to increase the density of the core, the stress generated at corner portions of each punch is reduced. Accordingly, the punch is unlikely to be damaged. Since the shortest distances are based on the lengths between an outer-circumferential edge and an inner-circumferential edge of the end face of each punch and an inner-circumferential face of a hole in the punch, as will be described later in detail, the length of the punch is small when a core with the shortest distances satisfying the range is manufactured. For this reason, if the recessed portions are not formed together when manufacturing the core with the shortest distances satisfying the range, the punches are more likely to deform. In contrast, deformation of the punch is suppressed as mentioned above by forming the recessed portions together when manufacturing the core with the shortest distances satisfying the range.

Furthermore, the above core allows magnetic fluxes to favorably pass from the teeth to the yoke. This is because the yoke and the teeth are integrally molded and thus no gap to act as a magnetic gap occurs between the yoke and the teeth.

(2) In an embodiment of the above core, the outer-circumferential face of each of the plurality of teeth may have:

a first region facing the outer-circumferential face of one of the teeth that is adjacent thereto on one side in the circumferential direction of the yoke; and a second region facing the outer-circumferential face of one of the teeth that is adjacent thereto on another side in the circumferential direction of the yoke, and each of the plurality of recessed portions may have a portion connected to the first region and a portion connected to the second region.

With the above core, the density of the core and the productivity thereof can be readily increased. This is because, in the above core, the effect of reducing the stress generated at corner portions of each punch is high.

(3) In an embodiment of the above core, each of the plurality of recessed portions may be connected to a perimeter in the circumferential direction of the outer-circumferential face of each one of the plurality of teeth.

With the above core, the density of the core and the productivity thereof can be readily increased further. This is because, in the above core, the effect of reducing the stress generated at the corner portions of each punch is even higher.

(4) In an embodiment of the above core, each of the plurality of recessed portions may have an inclined face that becomes deeper as the inclined face approaches, from the first face, the outer-circumferential face of each one of the plurality of teeth.

With the above core, the density of the core and the productivity thereof can be readily increased further. The recessed portions having the inclined face are formed using punches that are provided with protruding portions having an inclined face. Due to the protruding portions of the punches having the inclined face, the effect of reducing the stress generated at corner portions of each punch is further increased, as will be described later in detail.

(5) In an embodiment of the above core, the yoke may have a cutout portion provided on at least one of the outer-circumferential face side and the inner-circumferential face side of the yoke with respect to the teeth, and the cutout portion may be open in at least one of the outer-circumferential face and the inner-circumferential face of the yoke.

With the above core, a later-described rotating electric machine can be readily constructed. This is because, with the above core, the cutout portion can be used to position the core within a case of the rotating electric machine. In addition, with the above core, an end portion of a winding wire of a coil in the stator can be hooked onto the cutout portion and readily pulled out.

(6) In an embodiment of the above core having the cutout portion, the cutout portion may be open at a portion corresponding to a portion between adjacent ones of the teeth in at least one of the outer-circumferential face and the inner-circumferential face of the yoke.

The above core can be readily positioned within the case of the rotating electric machine. In addition, an end portion of a winding wire can be readily hooked onto the above core. Furthermore, the above core has high design flexibility in terms of the shape and size of the cutout portion. This is because the cutout portion is provided at a portion spaced apart from the teeth on which coils are arranged.

(7) In an embodiment of the above core having the cutout portion, a length of the cutout portion in the circumferential direction of the yoke may be 1.0 mm or more and 10 mm or less.

If the length in the circumferential direction of the cutout portion is 1.0 mm or more, the core can be readily positioned within the case of the rotating electric machine. If the length in the circumferential direction of the cutout portion is 10 mm or less, the length in the circumferential direction of the cutout portion is not excessively large. Thus, a decrease in the magnetic circuit area of the yoke due to the cutout portion is suppressed. Accordingly, degradation of magnetic characteristics due to a decrease in the magnetic circuit area can be readily suppressed.

(8) In an embodiment of the above core having the cutout portion, a length of the cutout portion in a radial direction of the yoke may be 0.5 mm or more and 5 mm or less.

If the length in the radial direction of the cutout portion is 0.5 mm or more, the core can be readily positioned within the case of the rotating electric machine. If the length in the radial direction of the cutout portion is 5 mm or less, the length in the radial direction of the cutout portion is not excessively large. Thus, a decrease in the magnetic circuit area of the yoke due to the cutout portion can be suppressed. Accordingly, degradation of magnetic characteristics due to a decrease in the magnetic circuit area can be readily suppressed.

(9) In an embodiment of the above core, a relative density of the powder compact may be 90% or more.

Since the above core has a high density, the core has excellent magnetic characteristics, such as saturation magnetic flux density, and mechanical characteristics, such as strength.

(10) In an embodiment of the above core, the powder compact may be made of soft magnetic powder, and the soft magnetic powder may have a plurality of iron-based particles made of at least one type of metal selected from a group consisting of pure iron, Fe—Si alloys, and Fe—Al alloys.

The above core has a high density and has excellent dimensional accuracy. This is because the material is relatively soft, and thus, soft magnetic particles readily deform when the powder compact is molded.

(11) A stator according to one aspect of the present disclosure is a stator of an axial gap rotating electric machine, the stator including:

the core according to any one of the above items (1) to (10); and a coil arranged on each of the plurality of teeth in the core.

The above stator makes it possible to construct a rotating electric machine that has excellent magnetic characteristics and productivity. This is because the core of the stator is the above core that has a high density and has excellent productivity.

(12) A rotating electric machine according to one aspect of the present disclosure is an axial gap rotating electric machine that includes a rotor and a stator, the rotor and the stator being arranged opposite to each other in an axial direction, wherein the stator is the stator according to the above item (11).

The above rotating electric machine has excellent magnetic characteristics and productivity. This is because the core of the stator is the above core that has a high density and has excellent productivity.

Details of Embodiments of Present Disclosure

The details of the embodiments of the present disclosure will be described below with reference to the drawings. The same reference sign in the diagrams indicates an element with the same name.

Embodiment 1

[Core]

Figure 12:
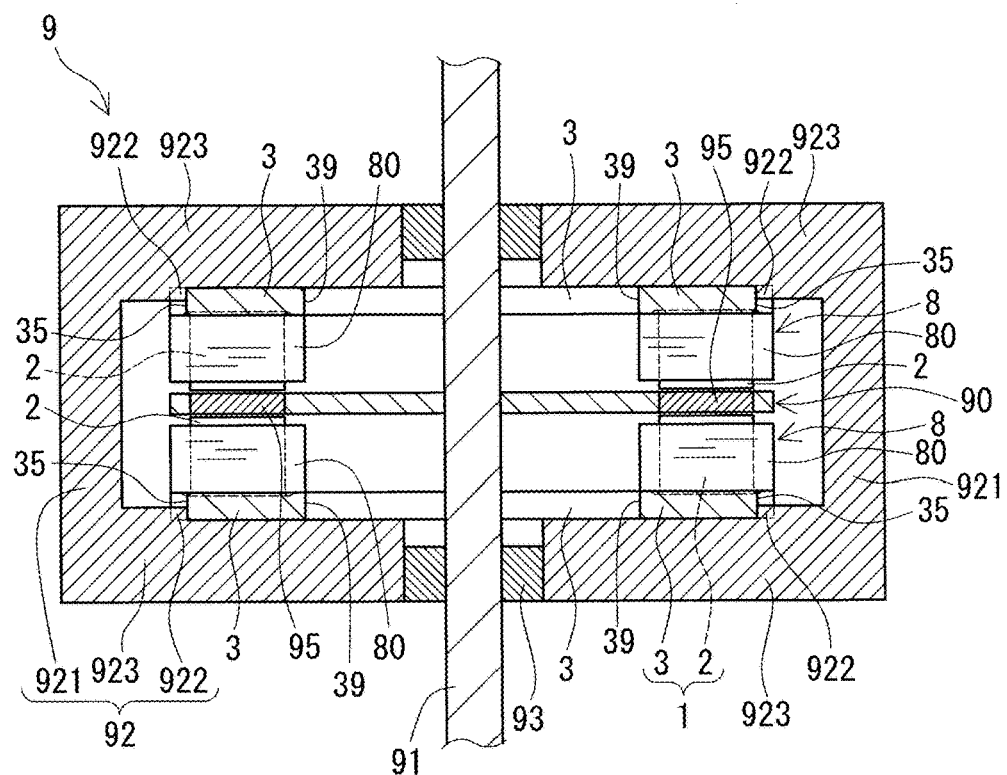
FIG. 12 is a cross-sectional view showing a schematic sketch of a rotating electric machine according to Embodiment 4.

A core 1 according to Embodiment 1 will be described with reference mainly to FIGS. 1 to 5. The core 1 according to Embodiment 1 is used in a later-described axial gap rotating electric machine 9 (FIG. 12). This core 1 includes a yoke 3 with an annular plate shape, and a plurality of teeth 2 that each have a columnar shape (FIG. 1). The yoke 3 has a first face 31 that has a flat plate shape. The first face 31 connects an outer-circumferential face 30o to an inner-circumferential face 30i of the yoke 3. The plurality of teeth 2 are provided on the first face 31 of the yoke 3 at intervals in a circumferential direction of the yoke 3. Each of the plurality of teeth 2 has an outer-circumferential face 21 that protrudes in an axial direction of the yoke 3 with respect to the first face 31 of the yoke 3. The yoke 3 and the plurality of teeth 2 are constituted by an integrally-molded powder compact. A feature of the core 1 according to Embodiment 1 is that the following requirements (1) and (2) are met.

(1) The yoke 3 has a plurality of recessed portions 34. Each of the plurality of recessed portions 34 is connected to at least a portion of the outer-circumferential face 21 of each one of the plurality of teeth portions 2.

(2) At least either all of the shortest distances L1 (FIG. 2) between an outer-circumferential edge 333 of the first face 31 and the outer-circumferential faces 21 of the plurality of teeth 2, or all of the shortest distances L2 (FIG. 2) between an inner-circumferential edge 334 of the first face 31 and the outer-circumferential faces 21 of the plurality of teeth 2, is a specific length.

Each configuration will be described below in detail. In the following description, the yoke 3 side of the core 1 is the lower side, and the teeth 2 side is the upper side.

[Yoke]

The yoke 3 has the outer-circumferential face 30o, the inner-circumferential face 30i, the first face 31 that has a flat plate shape, and a second face 32 that has a flat plate shape (FIG. 1). The first face 31 serves as an upper face of the yoke 3. The second face 32 serves as a lower face of the yoke 3. The yoke 3 magnetically couples adjacent teeth 2, of the teeth 2 arranged in the circumferential direction of the yoke 3, to each other. The yoke 3 has an axial hole portion 39 that penetrates the upper and lower faces at a center portion thereof.

(Recessed Portion)

Figure 6:
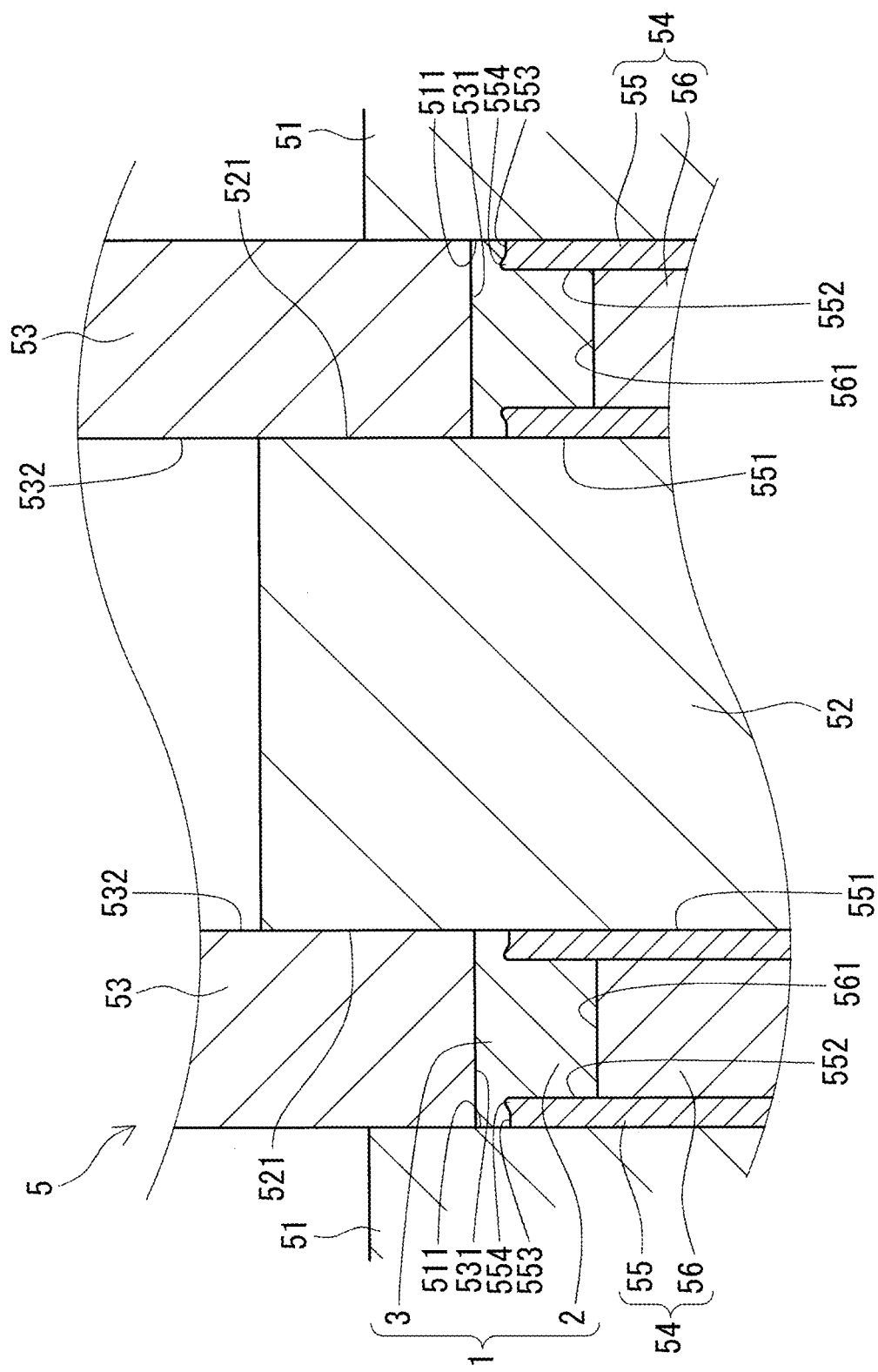
FIG. 6 is a cross-sectional view showing a schematic sketch of a mold for manufacturing the core according to Embodiment 1.

Each recessed portion 34 is provided so as to be connected to at least a portion in the circumferential direction of the outer-circumferential face 21 of each one of the teeth 2. That is to say, each recessed portion 34 connects the first face 31 to the outer-circumferential face 21 of the corresponding tooth 2. The recessed portions 34 are formed by protruding portions 554 of a first lower punch 55 of a later-described mold 5 (FIG. 6). Each protruding portion 554 is provided in the first lower punch 55 so as to be connected to at least a portion in the circumferential direction of an inner-circumferential face of a corresponding second hole portion 552. Damage to the first lower punch 55 can be suppressed as a result of the first lower punch 55 including the protruding portions 554. The reason for this is as follows. When the first lower punch 55 compresses material powder of the core 1, deformation of the first lower punch 55 is suppressed by an anchor effect obtained due to the protruding portions 554 proceeding into the material powder. For this reason, the stress generated at inner-circumferential corner portions of each second hole portion 552 is reduced. That is to say, the yoke 3 including the recessed portions 34 reduces damage to the mold 5, and thus the core 1 has excellent productivity.

Figure 2:
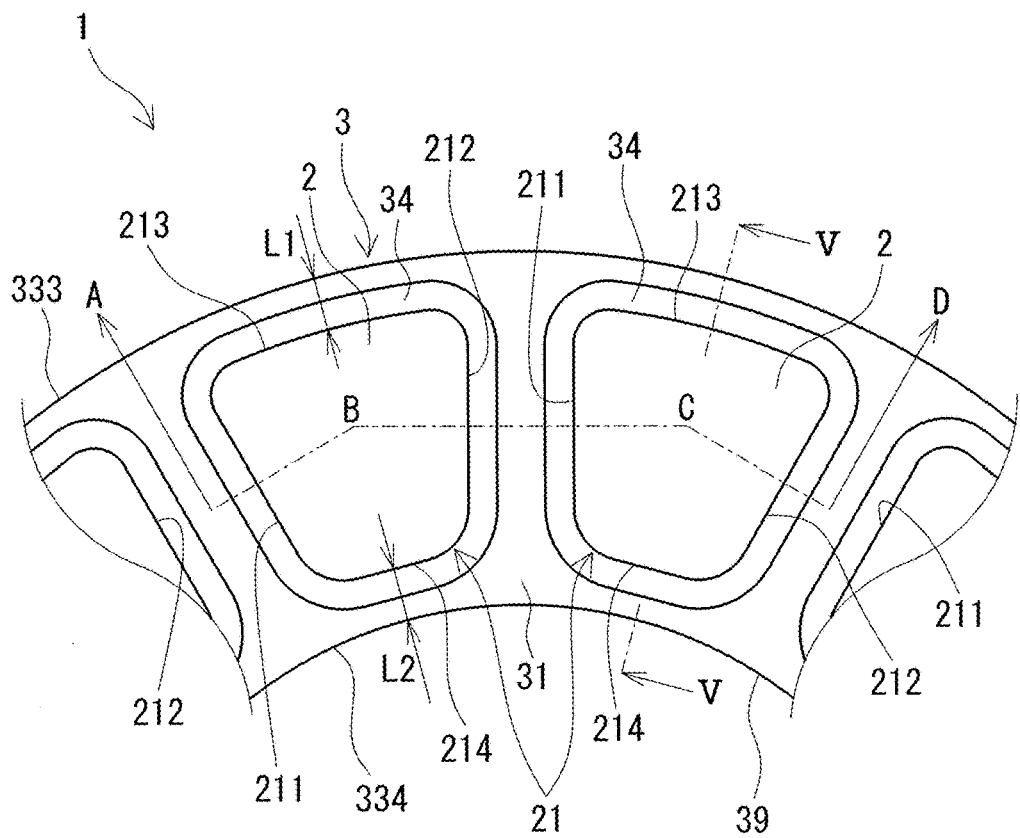
FIG. 2 is a top view showing a schematic sketch of a part of the core according to Embodiment 1.
Figure 3:
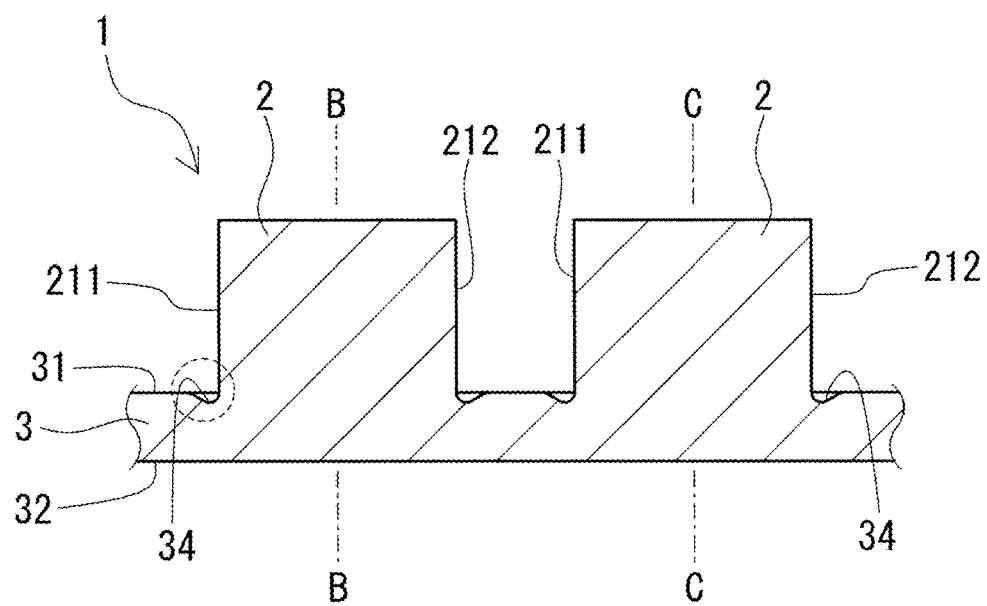
FIG. 3 is a combined cross-sectional view showing a schematic sketch of the core taken along a line A-B-C-D in FIG. 2.

It is preferable that each recessed portion 34 has a portion that is connected to a first region 211 of the outer-circumferential face 21 of the corresponding tooth 2, and a portion that is connected to a second region 212 of the outer-circumferential face 21 of the corresponding tooth 2 (FIGS. 2 and 3). The first region 211 is a region of the outer-circumferential face 21 of each tooth 2 that faces the outer-circumferential face 21 of an adjacent tooth 2 on one side in the circumferential direction of the yoke 3. The second region 212 is a region of the outer-circumferential face 21 of each tooth 2 that faces the outer-circumferential face 21 of an adjacent tooth 2 on the other side in the circumferential direction of the yoke 3. A facing region refers to a region in which the outer-circumferential faces 21 oppose each other in a region between an inscribed circle in contact with the inner-circumferential side of the plurality of teeth 2 and a circumscribed circle in contact with the outer-circumferential side of the plurality of teeth 2, of concentric circles with the center being the centroid of the yoke 3.

Due to each recessed portion 34 having the portion connected to the first region 211 of the corresponding tooth 2 and the portion connected to the second region 212, damage to the first lower punch 55 (FIG. 6) is effectively suppressed. In this case, each of the later-described protruding portions 554 of the first lower punch 55 is provided so as to be connected to a first region and a second region of the inner-circumferential face of the corresponding second hole portion 552. For this reason, deformation of the first lower punch 55 due to lateral pressure during compression molding is effectively suppressed. Accordingly, the effect of reducing the stress generated at inner-circumferential corner portions of the second hole portion 552 is high. It is preferable that each recessed portion 34 further has a portion that is connected to the entire length of the first region 211 of the corresponding tooth 2 and a portion that is connected to the entire length of the second region 212. The portion connected to the first region 211 and the portion connected to the second region 212 may be separate from each other rather than being connected to each other, or may be connected to each other. For example, if the portion connected to the first region 211 and the portion connected to the second region 212 are not connected to each other, the recessed portion 34 may have a first recessed portion that is connected to the first region 211, and a second recessed portion that is connected to the second region 212. Particularly, it is preferable that each recessed portion 34 is provided so as to be connected to the perimeter in the circumferential direction of the outer-circumferential face 21 of the corresponding tooth 2. The reason for this is that the effect of reducing the stress generated at the inner-circumferential corner portions of the second hole portion 552 is even higher, and damage to the mold 5, more specifically the first lower punch 55 can be further suppressed.

Each recessed portion 34 in this example is provided so as to be connected to the perimeter in the circumferential direction of the outer-circumferential face 21 of the corresponding tooth 2. The shape of each recessed portion 34 in a plan view is a ring shape, extending along the circumferential direction of the outer-circumferential face 21 of the corresponding tooth 2, and is, here, a trapezoidal ring shape.

The cross-sectional shape of each recessed portion 34 can be selected as appropriate. The cross-sectional shape of each recessed portion 34 refers to the shape of a cross section taken along a plane orthogonal to the longitudinal direction of the recessed portion 34, i.e., a plane that includes the axis of the corresponding tooth 2 and is orthogonal to the outer-circumferential face 21.

Figure 4:
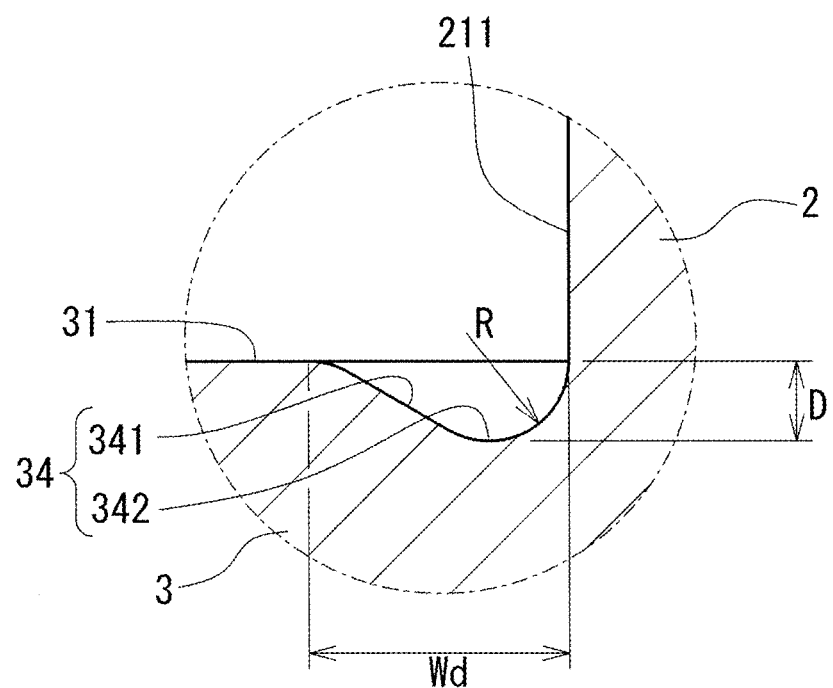
FIG. 4 is an enlarged view of an area in the vicinity of a recessed portion within a broken-line circle in FIG. 3.
Figure 5:
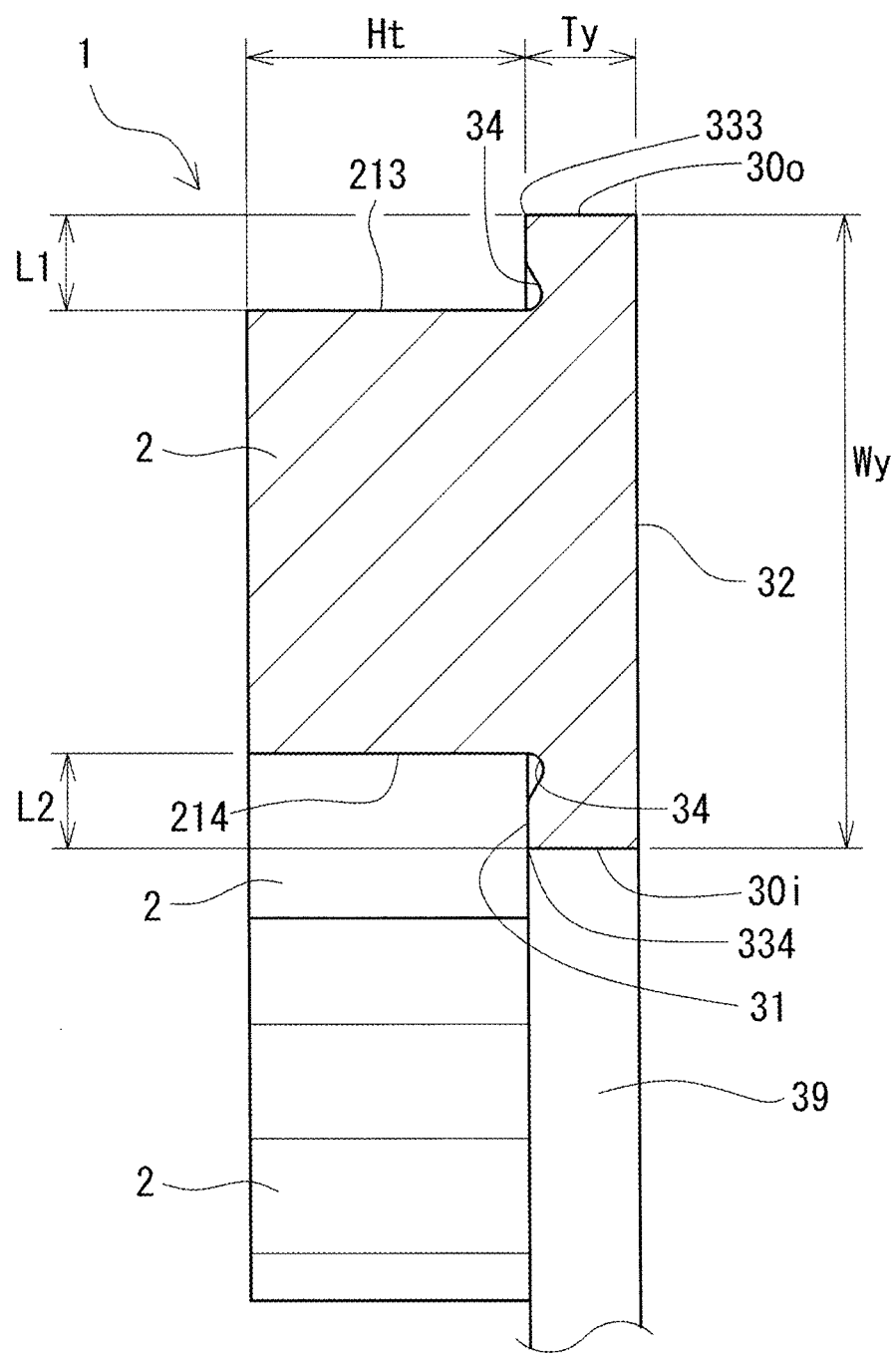
FIG. 5 is a cross-sectional view showing a schematic sketch of the core taken along a cutting plane line (V)-(V) in FIG. 2.

The cross-sectional shape of each recessed portion 34 in this example has an inclined face 341 and a curved face 342 (FIGS. 3 to 5). The inclined face 341 inclines such that the depth D of the recessed portion 34 increases as it approaches the outer-circumferential face 21 of the corresponding tooth 2 from the first face 31. The depth D of the recessed portion 34 refers to the length thereof in the axial direction of the yoke 3. The curved face 342 is provided in an arc shape that is connected to the outer-circumferential face 21 of the tooth 2 from the inclined face 341. The cross-sectional shape of each recessed portion 34 is an asymmetrical shape with respect to a perpendicular that passes through the vertex of the recessed portion 34. The length of the inclined face 341 is longer than the length of the curved face 342.

Due to the cross-sectional shape of each recessed portion 34 having the inclined face 341, damage to the first lower punch 55 (FIG. 6) can be readily suppressed even if the molding pressure during molding is increased. Accordingly, the density and productivity of the core 1 can be increased. Each of the later-described protruding portions 554 of the first lower punch 55 has an inclined face that corresponds to the inclined face 341 of the recessed portion 34. When the material powder is compressed using the first lower punch 55, pressure acts on the inclined face of the protruding portion 554. The pressure received by the inclined face of the protruding portion 554 acts toward the second hole portion 552 side of the first lower punch 55. That is to say, the pressure received by the inclined face of the protruding portion 554 works in a direction offsetting the lateral pressure acting on the inner-circumferential face of the second hole portion 552 during compression molding. For this reason, the lateral pressure acting on the first lower punch 55 can be at least partially offset by using the pressure received by the inclined face of the protruding portion 554 during compression molding. Accordingly, deformation of the first lower punch 55 due to the lateral pressure is further suppressed. Therefore, the stress generated at the inner-circumferential corner portions of the second hole portion 552 is further reduced.

Although not shown in the diagrams, the cross-sectional shape of each recessed portion 34 may alternatively be constituted by an inclined face, a vertical face, and a corner portion. The inclined face is inclined such that the depth D of the recessed portion 34 increases as it approaches the outer-circumferential face 21 of the corresponding tooth 2 from the first face 31. The vertical face extends toward the lower side of the yoke 3 from the outer-circumferential face 21 of the tooth 2. The inclined face and the vertical face intersect at the corner portion. Alternatively, the cross-sectional shape of the recessed portion 34 may be, for example, a semicircular shape, a triangular shape, a rectangular shape, or the like. The "semicircular shape", "triangular shape", and "rectangular shape" include not only geometric semicircles, triangles, and rectangles, but also areas that are regarded as being substantially semicircular, triangular, and rectangular. For example, the "triangular shape" and "rectangular shape" include shapes with a rounded corner portion. Also, the "triangular shape" includes a V-shape, and the "rectangular shape" includes a U-shape.

It is preferable that the depth D of each recessed portion 34 is 0.2 mm or more and 2.5 mm or less, for example (FIG. 4). It is preferable that the width Wd of each recessed portion 34 is 0.5 mm or more and 3.0 mm or less, for example. The depth D of the recessed portion 34 is as mentioned above. The width Wd of the recessed portion 34 refers to the length of a cross section of the recessed portion 34 that is parallel to the first face 31. The cross section of the recessed portion 34 refers to a cross section taken along a plane orthogonal to the longitudinal direction of the recessed portion 34, i.e., a plane that includes the axis of the corresponding tooth 2 and is orthogonal to the outer-circumferential face 21. If the depth D of each recessed portion 34 is 0.2 mm or more or the width Wd of the recessed portion 34 is 0.5 mm or more, damage to the first lower punch 55 (FIG. 6) can be readily suppressed. If the depth D of each recessed portion 34 is 2.5 mm or less or the width Wd of each recessed portion 34 is 3.0 mm or less, a decrease in the magnetic circuit area of the yoke 3 due to the recessed portion 34 is suppressed. For this reason, degradation of magnetic characteristics due to a decrease in the magnetic circuit area can be readily suppressed. It is further preferable that the depth D of each recessed portion 34 is 0.5 mm or more and 2 mm or less. It is further preferable that the width Wd of each recessed portion 34 is 1.0 mm or more and 2.0 mm or less. In this example, the curvature radius R of the curved face 342 is 0.5 mm, the depth D of each recessed portion 34 is 0.5 mm, and the width Wd of the recessed portion 34 is 1.6 mm.

(Size)

The thickness Ty of the yoke 3 may be, for example, 1.0 mm or more and 10 mm or less, and may further be 1.5 mm or more and 7.0 mm (FIG. 5). The thickness Ty of the yoke 3 refers to the length in the axial direction of the yoke 3 between the first face 31 and the second face 32. The inner diameter of the yoke 3 may be, for example, 5 mm or more and 150 mm or less. The outer diameter of the yoke 3 may be, for example, 30 mm or more and 300 mm or less. In this example, the thickness Ty of the yoke 3 is 3.5 mm. The length Wy in the radial direction of the yoke 3, i.e., the difference between the inner and outer diameters is 20 mm.

[Teeth]

Each tooth 2 protrudes in the axial direction of the yoke 3 with respect to the first face 31 of the yoke 3 (FIGS. 1 to 3 and 5). That is to say, each tooth 2 is a portion above the same plane as the first face 31 in the core 1. Each tooth 2 is provided with a coil 80 when a later-described stator 8 (FIG. 11) is constructed with the core 1 and the coils 80.

A plurality of teeth 2 are provided (FIG. 1). The specific number of teeth 2 can be selected as appropriate. The number of teeth 2 in this example is 12. The plurality of teeth 2 are integrally molded with the yoke 3. For this reason, no gap to act as a magnetic gap occurs between the yoke 3 and each tooth 2. Accordingly, the magnetic flux favorably passes from each tooth 2 to the yoke 3. The teeth 2 are arranged at predetermined intervals in the circumferential direction of the yoke 3. In this example, the intervals between adjacent teeth 2 are equal to each other in the circumferential direction of the yoke 3.

The shape of each tooth 2 may be a polygonal column shape, a cylindrical column shape, or the like. The polygonal column shape may be a triangular column shape with a cross-sectional shape of a tooth 2 taken along a plane orthogonal to the axial direction of the tooth 2 being triangular, or may be a rectangular column shape with the cross-sectional shape being rectangular, for example. The axial direction of the tooth 2 is the direction in which the tooth 2 protrudes and is the same as the axial direction of the yoke 3. The triangular column shape may be, for example, a triangular column shape with a cross-sectional shape being an isosceles triangle. The rectangular column shape may be, for example, a trapezoidal column shape with a cross-sectional shape being trapezoidal, or a rectangular parallelepiped shape with a cross-sectional shape being rectangular. The cross-sectional shape may be uniform in the axial direction of the tooth 2. The "trapezoidal shape" and "rectangular shape" includes not only geometric trapezoids and triangles, but also areas that are regarded as being substantially trapezoidal and triangular, including shapes with a rounded corner portion as in this example, similarly to the aforementioned recessed portion 34.

In this example, the shape of each tooth 2 is a trapezoidal column shape with a cross-sectional shape being a trapezoidal shape (FIGS. 1 and 2). The outer-circumferential face 21 of each tooth 2 has the first region 211, the second region 212, an outer-circumferential region 213, and an inner-circumferential region 214. The first region 211 and the second region 212 are as described above. The first region 211 and the second region 212 in this embodiment intersect the circumferential direction of the yoke 3. The outer-circumferential region 213 is a region that is provided on the outer-circumferential face 30$o$ side of the yoke 3, and connects the first region 211 on the outer-circumferential face 30$o$ side of the yoke 3 and the second region 212 on the outer-circumferential face 30$o$ side of the yoke 3 to each other. The outer-circumferential region 213 is provided in an arc shape extending along the circumferential direction of the outer-circumferential face 30$o$ of the yoke 3. The inner-circumferential region 214 is a region that is provided on the inner-circumferential face 30$i$ side of the yoke 3, and connects the first region 211 on the inner-circumferential face 30$i$ side of the yoke 3 and the second region 212 on the inner-circumferential face 30$i$ side of the yoke 3 to each other. The inner-circumferential region 214 is provided in a straight shape. The length of the outer-circumferential region 213 of each tooth 2 is the longer length, and the length of the inner-circumferential region 214 is the shorter length (FIG. 2). The cross-sectional shape of each tooth 2 is uniform in the axial direction of the tooth 2. If the shape of the tooth 2 is a trapezoidal column shape, the cross-sectional area thereof can be readily secured. In addition, dead space in the core 1 can be readily reduced, and a stator 8 with a high space factor can be readily constructed.

The teeth 2 have the same size. The length of each tooth 2 is smaller than the length of the yoke 3. The length of each tooth 2 and the length of the yoke 3 refer to the lengths in the radial direction of the yoke 3. In this example, the length of each tooth 2 is a length that allows a later-described predetermined interval to be provided between the outer-circumferential edge 333 of the first face 31 of the yoke 3 and the outer-circumferential face 21 of the tooth 2, and between the inner-circumferential edge 334 of the first face 31 of the yoke 3 and the tooth 2. The cross-sectional area of each tooth 2 may be, for example, 5 mm$^2$ or more and 800 mm$^2$ or less. The cross-sectional area of each tooth 2 refers to the area of a cross section of the tooth 2 taken along a plane orthogonal to the axial direction of the tooth 2. The height Ht of each tooth 2 may be, for example, 3 mm or more and 40 mm or less (FIG. 5). The height Ht of the tooth 2 is a protruding length of the tooth 2 that protrudes in the axial direction of the yoke 3 with respect to the first face 31. The height Ht of the tooth 2 in this example is 8.8 mm.

[Distance between Yoke and Tooth]

At least either all of the shortest distances L1 between the outer-circumferential edge 333 of the first face 31 of the yoke 3 and the outer-circumferential faces 21 of the teeth 2, or all of the shortest distances L2 between the inner-circumferential edge 334 of the first face 31 of the yoke 3 and the outer-circumferential faces 21 of the teeth 2, may be 4 mm or less (FIG. 2). The shortest distances L1 between the outer-circumferential edge 333 of the first face 31 of the yoke 3 and the outer-circumferential faces 21 of the teeth 2 may simply be referred to as the shortest distance(s) L1 on the outer-circumferential side. The shortest distances L2 between the inner-circumferential edge 334 of the first face 31 of the yoke 3 and the outer-circumferential faces 21 of the teeth 2 may simply be referred to as the shortest distance(s) L2 on the inner-circumferential side. The shortest distance L1 on the outer-circumferential side and the shortest distance L2 on the inner-circumferential side refer to the distances in the case where the yoke 3 is viewed from the axial direction in a plan view. Of course, all of the shortest distances L1 on the outer-circumferential side and all of the shortest distances L2 on the inner-circumferential side may satisfy the aforementioned range. When at least either all of the shortest distances L1 on the outer-circumferential side and all of the shortest distances L2 on the inner-circumferential side are 4 mm or less, damage to the first lower punch 55 of the mold 5 can be effectively suppressed by providing the recessed portions 34. At least either all of the shortest distances L1 on the outer-circumferential side and all of the shortest distances L2 on the inner-circumferential side is preferably 1 mm or more, and is further preferably 1.5 mm or more and 3.5 mm or less. In this example, all of the shortest distances L1 on the outer-circumferential side and all of the shortest distances L2 on the inner-circumferential side are the same. Note that all of the shortest distances L1 on the outer-circumferential side and all of the shortest distances L2 on the inner-circumferential side may differ from each other. In this example, the shortest distance L1 on the outer-circumferential side is the distance at the position of a region in which the outer-circumferential edge 333 of the first face 31 of the yoke 3 and the outer-circumferential region 213 of the outer-circumferential face 21 of the tooth 2 oppose each other in the circumferential direction. The shortest distance L2 on the inner-circumferential side is the distance at the position of a portion at which each tooth 2 is halved in the circumferential direction by a line segment extending along the radial direction. In this example, all of the shortest distances L1 on the outer-circumferential side and all of the shortest distances L2 on the inner-circumferential side are 3 mm.

[Material]

The powder compact is obtained by subjecting soft magnetic powder to compression molding. The powder compact is mainly composed of soft magnetic powder. The soft magnetic powder has a plurality of iron-based particles composed of pure iron or an iron-based alloy. Pure iron has a purity of 99 mass % or more. The iron-based alloy may be at least one selected from a group consisting of Fe—Si (silicon) alloys, Fe—Al (aluminum) alloys, Fe—Si—Al alloys, and Fe—Ni (nickel) alloys. The Fe—Si alloys may include, for example, silicon steel. The Fe—Si—Al alloys may include, for example, sendust. Fe—Ni alloys may be, for example, permalloy. Since the above materials are relatively soft, the soft magnetic particles readily deform when the powder compact is molded. For this reason, the core 1 has a high density and has excellent dimensional accuracy. It is preferable that the soft magnetic powder is the aforementioned ion-based particles with an insulating coating on the surfaces thereof. If an insulating coating is provided on the surfaces of the iron-based particles, electrical insulation between the particles can be ensured by the insulating coating. Therefore, iron loss of the powder compact due to eddy current loss is reduced. The insulating coating may be, for example, a phosphate coating, a silica coating, or the like.

[Relative Density]

It is preferable that the relative density of the powder compact is 90% or more. The reason for this is that the such a powder compact has excellent magnetic characteristics, such as saturation magnetic flux density, and excellent mechanical characteristics, such as strength. It is further preferable that the relative density is 93% or more. The "relative density of the powder compact" refers to the proportion (%) of the density of the actual powder compact to the true density of the powder compact. That is to say, the relative density of the powder compact is obtained by [(actual density of powder compact/true density of powder compact)×100]. The actual density of the powder compact can be obtained by immersing the powder compact in oil to impregnate the powder compact with oil, and calculating [oil impregnation density×(mass of powder compact before being impregnated with oil/mass of powder compact after being impregnated with oil)]. The oil impregnation density is (mass of powder compact after being impregnated with oil/volume of powder compact after being impregnated with oil). That is to say, the actual density of the powder compact can be obtained by (mass of powder compact before being impregnated with oil/volume of powder compact after being impregnated with oil). The volume of the powder compact after being impregnated with oil can typically be measured by means of a liquid displacement method. The true density of the powder compact refers to the theoretical density in the case where no void is included therein. The true density of the powder compact can also be obtained based on the true density of the soft magnetic powder used.

[Core Manufacturing Method (I)]

The core 1 according to Embodiment 1 can be manufactured by means of a core manufacturing method (I) that includes a filling step and a molding step. In the filling step, a cavity of the mold 5 is filled with the material powder (FIG. 6). In the molding step, the material powder in the cavity is subjected to compression molding. The mold 5 will be described first with reference to FIG. 6, and then the steps will be described.

[Mold]

The mold 5 includes a die 51, a core rod 52, an upper punch 53, and a lower punch 54. The cavity to be filled with the material powder is constituted by the die 51, the core rod 52, and the lower punch 54.

(Die)

The die 51 has a die hole 511. The die hole 511 has an inner-circumferential face that forms the outer-circumferential face 30o of the yoke 3. The inner-circumferential shape of the die hole 511 is a shape corresponding to the shape of the outer-circumferential face 30o of the yoke 3, and is a circular shape in this example.

(Core Rod)

The core rod 52 has an outer-circumferential face 521 that forms the inner-circumferential face 30i of the yoke 3. The shape of the core rod 52 is a shape corresponding to the shape of the inner-circumferential face 30i of the yoke 3, and is a cylindrical column shape in this example. The core rod 52 is arranged in the die hole 511 of the die 51.

(Upper Punch)

The upper punch 53 has a lower end face 531 that forms the second face 32 of the yoke 3. The shape of the upper punch 53 is a cylindrical shape. An insertion hole 532, into which the core rod 52 is inserted, is provided at the center of the upper punch 53. The inner-circumferential shape of the insertion hole 532 is a shape corresponding to the shape of the core rod 52, and is a circular shape in this example. The lower end face 531 of the upper punch 53 is formed as a flat face. The shape of the lower end face 531 of the upper punch 53 can be selected as appropriate in accordance with the shape of the second face 32 of the yoke 3, and is an annular shape in this example. The upper punch 53 is fitted into a space between the die hole 511 of the die 51 and the core rod 52.

(Lower Punch)

The lower punch 54 has a first lower punch 55 and second lower punches 56. The lower punch 54 is fitted into a space between the die hole 511 of the die 51 and the core rod 52. The first lower punch 55 and the second lower punches 56 can be independently driven in the vertical direction with respect to the die 51 and the core rod 52.

<First Lower Punch>

The first lower punch 55 forms the first face 31 and the recessed portions 34 of the yoke 3 and the circumferential faces of the teeth 2. The shape of the first lower punch 55 is a cylindrical shape. The first lower punch 55 has a first hole portion 551, a plurality of second hole portions 552, and an upper end face 553.

First Hole Portion

The first hole portion 551 has an inner-circumferential face into which the core rod 52 is inserted. The first hole portion 551 is provided so as to penetrate the first lower punch 55 in the vertical direction, at the center of the first lower punch 55. The inner-circumferential shape of the first hole portion 551 is a shape corresponding to the outer-circumferential shape of the core rod 52, and is a circular shape in this example.

Second Hole Portion

Each second hole portion 552 has an inner-circumferential face that forms the outer-circumferential face 21 of a corresponding tooth 2. Each second hole portion 552 is provided so as to penetrate the first lower punch 55 in the vertical direction around the outer circumference of the first hole portion 551 of the first lower punch 55. The number of second hole portions 552 is the number corresponding to the number of teeth 2, and is 12 in this example. The plurality of second hole portions 552 are provided at equal intervals in the circumferential direction of the first lower punch 55. The second lower punches 56 are inserted into the second hole portions 552.

The inner-circumferential shape of each second hole portion 552 can be selected as appropriate in accordance with the shape of the teeth 2, and is a trapezoidal shape in this example. That is to say, the inner-circumferential face of each second hole portion 552 has a trapezoidal ring shape, which is formed with a first region, a second region, an outer-circumferential region, and an inner-circumferential region. The first region is a region of the inner-circumferential face of each second hole portion 552 that opposes the inner-circumferential face of an adjacent second hole portion 552 on one side in the circumferential direction of the first lower punch 55. The second region is a region of the inner-circumferential face of the second hole portion 552 that opposes the inner-circumferential face of an adjacent second hole portion 552 on the other side in the circumferential direction of the first lower punch 55. The opposing region refers to a region in which the inner-circumferential faces oppose each other in a region between an inscribed circle in contact with the inner-circumferential side of the plurality of second hole portions 552 and a circumscribed circle in contact with the outer-circumferential side of the plurality of second hole portions 552, of concentric circles with the center being the centroid of the first lower punch 55. The first region and the second region intersect the circumferential direction of the upper end face 553. The outer-circumferential region is located on the outer-circumferential face side of the first lower punch 55, and connects end portions of the first region and the second region on the outer-circumferential face side of the first lower punch 55. The outer-circumferential region is provided in an arc shape extending along the circumferential direction of the outer-circumferential face of the first lower punch 55. The inner-circumferential region is located on the inner-circumferential face side of the first lower punch 55, and connects end portions of the first region and the second region on the inner-circumferential face side of the first lower punch 55. The inner-circumferential region is provided in a straight shape.

Upper End Face

The upper end face 553 forms the first face 31 and the recessed portions 34 of the yoke 3. The shape of the upper end face 553 is an annular shape. The shortest distance between an outer-circumferential edge of the upper end face 553 and the inner-circumferential face of each second hole portion 552 corresponds to the aforementioned shortest distance L1 on the outer-circumferential side, and the shortest distance between an inner-circumferential edge of the upper end face 553 and the inner-circumferential face of each second hole portion 552 corresponds to the aforementioned shortest distance L2 on the inner-circumferential side. The shortest distance between the outer-circumferential edge of the upper end face 553 and the inner-circumferential face of each second hole portion 552 and the shortest distance between the inner-circumferential edge of the upper end face 553 and the inner-circumferential face of each second hole portion 552 are 1 mm or more and 4 mm or less. These shortest distances are the lengths in the left-right direction of the paper of FIG. 6. In this example, both of the above shortest distances are 3 mm.

The upper end face 553 has protruding portions 554 each of which is connected to the inner-circumferential face of a corresponding second hole portion 552. The protruding portions 554 form the recessed portions 34 of the yoke 3. That is to say, the formation region, the cross-sectional shape, and the size of the recessed portions 34 of the yoke 3 are adjusted by adjusting the formation region, the cross-sectional shape, and the size of the protruding portions 554 as appropriate. Each protruding portion 554 in this example is provided so as to be connected to the perimeter in the circumferential direction of the inner-circumferential face of the corresponding second hole portion 552.

<Second Lower Punch>

Each of the second lower punches 56 has an upper end face 561 that forms an upper face of the tooth 2. The shape of the second lower punches 56 is a shape corresponding to the inner-circumferential shape of the second hole portions 552, and is a trapezoidal column shape in this example. The upper end face 561 of each second lower punch 56 is formed as a flat face. The shape of the upper end face 561 can be selected as appropriate in accordance with the shape of the end face of each tooth 2, and is a trapezoidal shape in this example. The number of second lower punches 56 is the same as the number of second hole portions 552, and is 12 in this example.

[Filling Step]

In this step, the cavity that is formed by the die 51, the core rod 52, and the lower punch 54 is filled with the material powder. The aforementioned soft magnetic powder can be used as the material powder. The material powder may contain a binder and a lubricant, in addition to the soft magnetic powder. A lubricant may be applied to the mold 5. The average particle diameter of powder of the soft magnetic material used as the material powder may be, for example, 20 μm or more and 350 μm or less. If the average particle diameter of the powder is in the above range, the powder is easy to handle and can readily be subjected to compression molding. The average particle diameter of the powder may also be 40 μm or more and 300 μm or less, and may further be 250 μm or less. The average particle diameter of the powder is measured using a laser diffraction/scattering type particle diameter/granularity distribution measuring device, and is defined as a particle diameter with which the integrated mass is 50% of the mass of all particles.

[Molding Step]

In this step, the material powder in the cavity is subjected to compression molding using the upper punch 53 and the lower punch 54. The higher the pressure applied during compression molding, the easier densification is, and a core 1 with a higher relative density is manufactured. The pressure may be, for example, 700 MPa or more, and may further be 980 MPa or more.

[Other Steps]

After the molding step, heat treatment may also be performed as necessary. For example, a low-loss core 1 is manufactured by removing distortion by means of heat treatment. Alternatively, for example, the binder and the lubricant may be removed through heat treatment. If the material powder contains the aforementioned coated particles, it is preferable that the heat treatment temperature is lower than or equal to the decomposition temperature of the insulating coating.

[Effects]

The core 1 according to Embodiment 1 has a large proportion of the size of the teeth 2 to the size of the yoke 3. In addition, since damage to the first lower punch 55 can be suppressed even if the molding pressure is increased, the core 1 has a high density and has excellent productivity.

Embodiment 2

[Core]

A core 1 according to Embodiment 2 will be described with reference to FIGS. 7 and 8. The core 1 according to Embodiment 2 differs from the core 1 according to Embodiment 1 in that the yoke 3 has cutout portions 35. The following description will focus on differences from Embodiment 1. Description of the same configurations as those of Embodiment 1 is omitted.

[Yoke]

(Cutout Portion)

The cutout portions 35 are recessed portions for positioning the core 1 with respect to a case 92 of a later-described rotating electric machine 9 (FIG. 12), and for hooking end portions of winding wires that constitute coils 80 of the later-described stator 8. The cutout portions 35 are provided on at least one of the outer-circumferential face 30o side and the inner-circumferential face 30i side of the yoke 3 with respect to the respective teeth 2. The cutout portions 35 are open in at least one of the outer-circumferential face 30o or the inner-circumferential face of the yoke 3. The cutout portions 35 are formed by cutting out an entire area in the thickness direction of the yoke 3.

It is preferable that the portion at which each cutout portion 35 is formed is at least one of the portions corresponding to areas between adjacent teeth 2, in at least one of the outer-circumferential face 30o and the inner-circumferential face 30i of the yoke 3. In this example, the cutout portions 35 are provided at the portions corresponding to the respective areas between adjacent teeth 2 (FIG. 8). That is to say, the number of cutout portions 35 is 12 in this example (FIG. 7). If a plurality of cutout portions 35 are provided as in this example, at least one of the cutout portions 35 can be used to position the core 1, and the other cutout portions 35 can be used to hook end portions of the winding wires.

Figure 8:
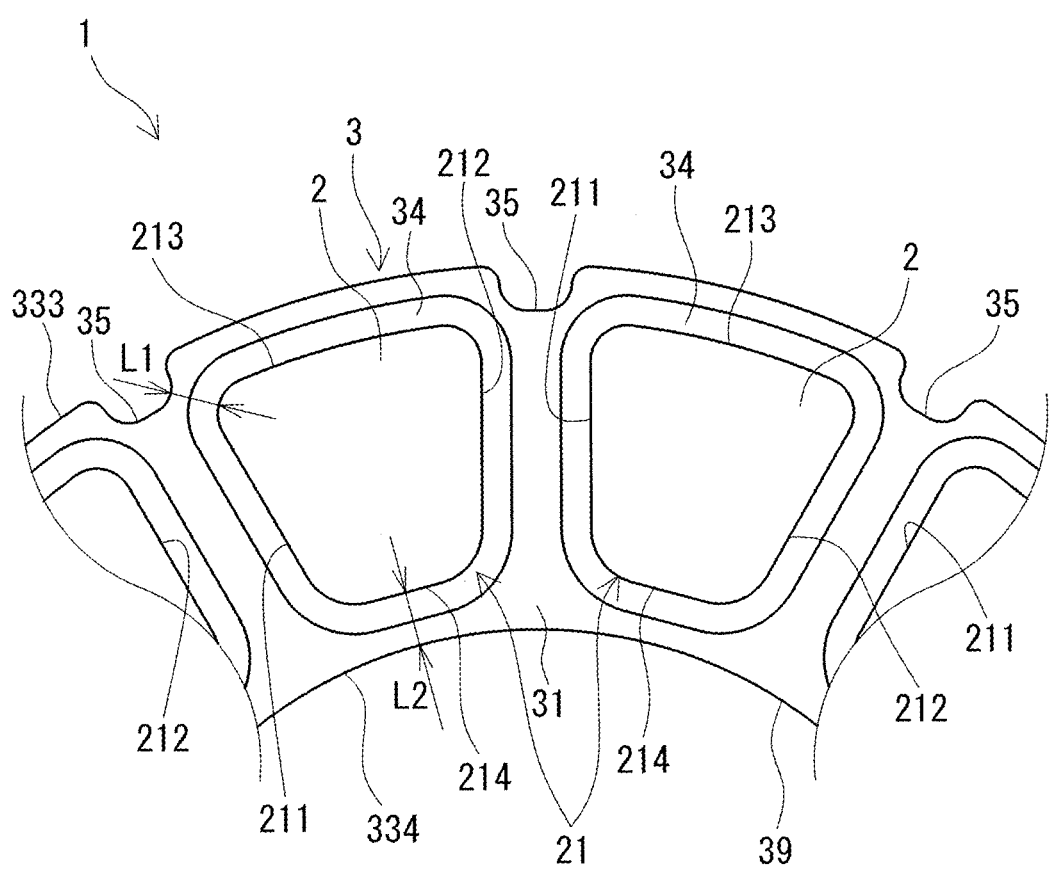
FIG. 8 is a top view showing a schematic sketch of a part of the core according to Embodiment 2.

The shape of each cutout portion 35 as viewed from the tooth 2 side in a plan view is a trapezoidal shape in this example (FIG. 8). Note that the shape of each cutout portion 35 in a plan view may alternatively be a triangular shape, a rectangular shape, a semicircular shape, or the like. The "trapezoidal shape", "triangular shape", "rectangular shape", and "semicircular shape" here include not only geometric trapezoids, triangles, rectangles, and semicircles, but also areas that are regarded as being substantially trapezoidal, triangular, rectangular, and semicircular, including shapes with a rounded corner portion as in this example, as with the aforementioned recessed portions 34.

The length of each cutout portion 35 in the circumferential direction of the yoke 3 and the length of the cutout portion 35 in the radial direction of the yoke 3 can be selected as appropriate in accordance with the formation portion, the shape, or the like of the cutout portion 35. The length in the circumferential direction of the yoke 3 is simply referred to as a circumferential length, and the length in the radial direction of the yoke 3 is simply referred to as a radial length, in some cases. The circumferential length of each cutout portion 35 refers to the length in the circumferential direction at an opening end of the cutout portion 35. That is to say, the circumferential length of each cutout portion 35 refers to the length of the cutout portion 35 along an extension of the outer-circumferential edge 333 of the first face 31. The radial length of each cutout portion 35 refers to the largest depth of the cutout portion 35. That is to say, the radial length of each cutout portion 35 refers to the largest length of the cutout portion 35 in the radial direction of the yoke 3 from the extension of the outer-circumferential edge 333 of the first face 31. It is preferable that the circumferential length of each cutout portion 35 is substantially a length smaller than the shortest distance between the first region 211 and the second region 212 of adjacent teeth 2.

In the case of this example, the circumferential length of each cutout portion 35 may be, for example, 1.0 mm or more and 10 mm or less. The radial length of each cutout portion 35 may be, for example, 0.5 mm or more and 5 mm or less. The core 1 can be readily positioned if the circumferential length of each cutout portion 35 is 1.0 mm or more and the radial length of the cutout portion 35 is 0.5 mm or more. Each cutout portion 35 is not excessively large if the circumferential length of the cutout portion 35 is 10 mm or less and the radial length of the cutout portion 35 is 5 mm or less. Thus, a decrease in the magnetic circuit area of the yoke 3 due to the cutout portions 35 is suppressed. Accordingly, degradation of magnetic characteristics due to a decrease in the magnetic circuit area can be readily suppressed. It is further preferable that the circumferential length of each cutout portion 35 is 1.5 mm or more and 8 mm or less. It is further preferable that the radial length of each cutout portion 35 is 1.0 mm or more and 4 mm or less. In this example, the circumferential length of each cutout portion 35 is about 6 mm. The radial length of each cutout portion 35 is 2.5 mm.

[Distance between Yoke and Tooth]

The shortest distance L1 between the outer-circumferential edge 333 of the first face 31 of the yoke 3 and the outer-circumferential face 21 of each tooth 2, i.e., the shortest distance L1 on the outer-circumferential side is the distance at the position between a corner portion of the cutout portion 35 and a corner portion of the outer-circumferential face 21 of the tooth 2 (FIG. 8). Corner portions of the outer-circumferential face 21 of each tooth 2 are a connection portion between the outer-circumferential region 213 and the first region 211, and a connection portion between the outer-circumferential region 213 and the second region 212. The length of the shortest distance L1 on the outer-circumferential side is about 2.7 mm. Note that the length between the outer-circumferential edge 333 of the first face 31 of the yoke 3 and the outer-circumferential face 21 of each tooth 2 at a portion at which the tooth 2 is halved in the circumferential direction by a line segment extending along the radial direction is 3 mm, as with the core 1 of Embodiment 1. The shortest distance L2 between the inner-circumferential edge 334 of the first face 31 of the yoke 3 and the outer-circumferential face 21 of each tooth 2, i.e., the shortest distance L2 on the inner-circumferential side is the distance at the same position and with the same length as the shortest distance L2 on the inner-circumferential side in the core 1 of Embodiment 1. That is to say, the shortest distance L2 on the inner-circumferential side is the distance at the position of a portion at which the tooth 2 is halved in the circumferential direction by a line segment extending along the radial direction. The length of the shortest distance L2 on the inner-circumferential side is 3 mm.

[Core Manufacturing Method (II)]

Figure 9:
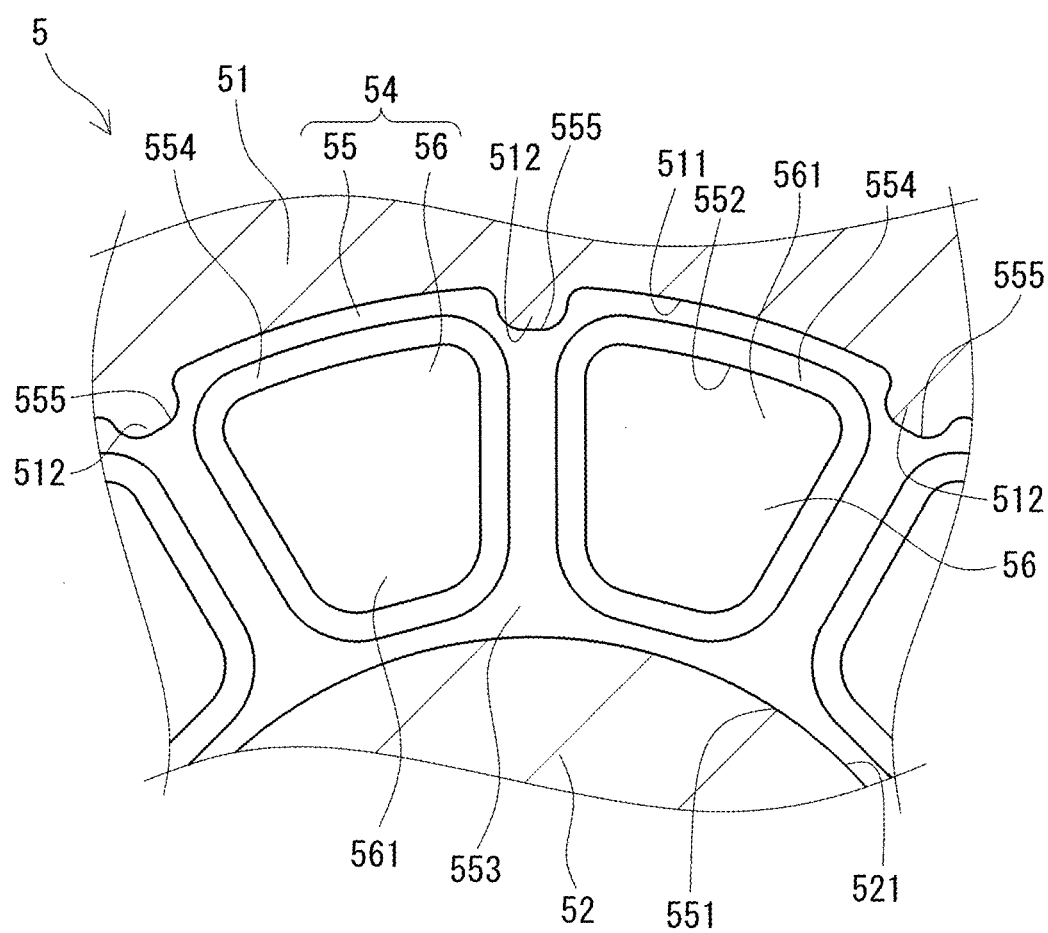
FIG. 9 is a partial cross-sectional view showing a schematic sketch of a mold for manufacturing the core according to Embodiment 2 and a core of sample No. 1.

The core 1 according to Embodiment 2 can be manufactured by means of a core manufacturing method (II) that includes the same steps as those of the above core manufacturing method (I). In the core manufacturing method (II), the mold 5 used differs from the mold 5 (FIG. 6) used in the core manufacturing method (I). Specifically, the die 51, the upper punch 53, and the first lower punch 55 of the mold 5 in the core manufacturing method (II) differ from those of the mold 5 in the core manufacturing method (I). The mold 5 used in the core manufacturing method (II) will be described with reference to FIGS. 9 and 10. The following description will focus on differences from the mold 5 in the core manufacturing method (I). FIG. 9 shows a state of the cavity before being filled with the material powder, as viewed from the upper punch side. In FIG. 9, the die 51 and the core rod 52 are hatched for convenience of description.

[Mold]

(Die)

The inner-circumferential face of the die 51 has protruding portions 512 that protrude toward the inner-circumferential side in the radial direction of the die 51 (FIG. 9). The protruding portions 512 form the cutout portions 35 of the yoke 3. The number, the shape, the size, and the formation portions of the protruding portions 512 can be selected as appropriate in accordance with the number, the shape, the size, and the formation portions of the cutout portions 35. The number of protruding portions 512 is 12 in this example. The shape of the protruding portions 512 is a trapezoidal shape in this example. The portions at which the protruding portions 512 are formed are portions of the outer-circumferential face of the first lower punch 55 that correspond to areas between adjacent second hole portions 552.

(Upper Punch)

Although not shown in the diagrams, the outer-circumferential face of the upper punch 53 has recessed portions to which the protruding portions 512 of the die 51 are fitted. The number, the shape, the size, and the formation portions of recessed portions correspond to those of the protruding portions 512.

(Lower Punch)

<First Lower Punch>

Figure 10:
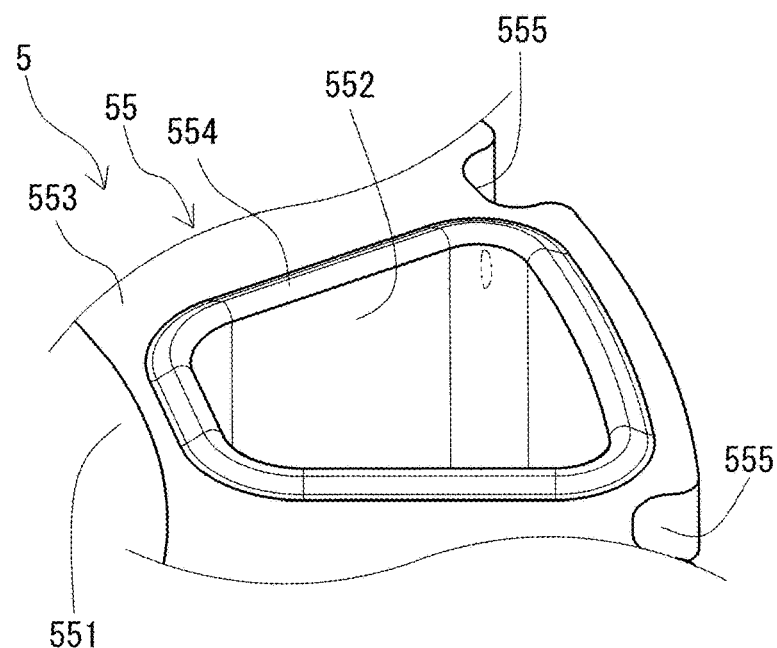
FIG. 10 is a perspective view showing a schematic sketch of a first lower punch of the mold for manufacturing the core according to Embodiment 2 and the core of sample No. 1.

The outer-circumferential face of the first lower punch 55 has recessed portions 555 to which the protruding portions 512 of the die 51 are fitted, similarly to the upper punch 53 (FIGS. 9 and 10). The number, the shape, the size, and the formation portions of the recessed portions 555 correspond to those of the protruding portions 512.

[Effects]

The core 1 according to Embodiment 2 has a high density, and has excellent productivity since the proportion of the size of the teeth 2 to the size of the yoke 3 is large, similarly to the core 1 according to Embodiment 1. In addition, due to the yoke 3 including the cutout portions 35, these cutout portions 35 can be used to position the core 1 within the case 92 of the later-described rotating electric machine 9, and therefore the rotating electric machine 9 can be readily constructed.

Embodiment 3

[Stator]

Figure 11:
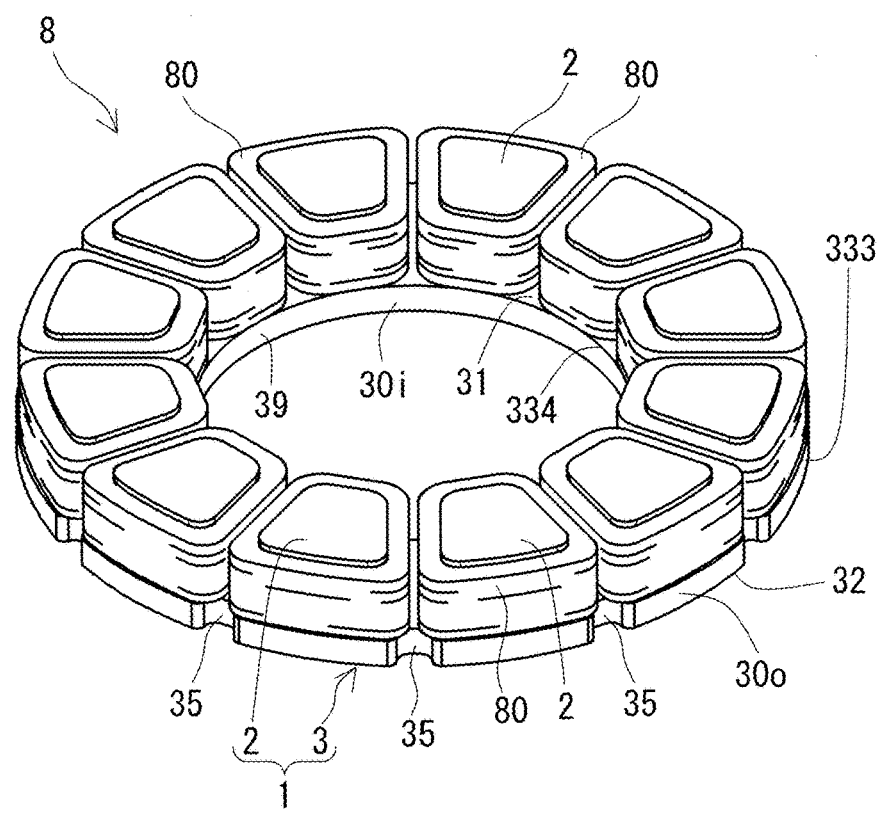
FIG. 11 is a perspective view showing a schematic sketch of a stator according to Embodiment 3.

A stator 8 according to Embodiment 3 will be described with reference to FIG. 11. The stator 8 according to Embodiment 3 includes a core 1 and coils 80. The core 1 may be the core 1 according to Embodiment 1 or the core 1 according to Embodiment 2. The coils 80 are arranged on the respective teeth 2 included in the core 1. This stator 8 is used in an axial gap rotating electric machine 9. FIG. 11 shows an example of the case where the stator 8 includes the core 1 according to Embodiment 2 shown in FIGS. 7 and 8. Of course, the stator 8 may have the core 1 shown in FIGS. 1 to 5.

Each coil 80 has a tubular portion formed by helically winding a winding wire. Each coil 80 in this example is an edgewise coil that has a trapezoidal tubular shape with a winding wire being a coated flat wire. Note that FIG. 11 only shows the tubular portions in a simplified manner and omits two end portions of each winding wire. The two end portions of each winding wire can be hooked onto the corresponding cutout portions 35 of the yoke 3 in the core 1, and pulled out. The stator 8 can be fabricated by separately fabricating the coils 80 in advance and fitting the coils 80 to the outer side of the teeth 2.

[Effects]

The stator 8 according to Embodiment 3 includes the core 1 according to Embodiment 2 that has a high density and has excellent productivity, and therefore makes it possible to construct an axial gap rotating electric machine 9 that has excellent magnetic characteristics and productivity.

Embodiment 4

[Rotating Electric Machine]

A rotating electric machine 9 according to Embodiment 4 will be described with reference to FIG. 12. FIG. 12 is a cross-sectional view of the rotating electric machine 9 taken along a plane parallel to a rotating shaft 91 thereof and passing through the cutout portions 35 of the core 1. The rotating electric machine 9 includes a rotor 90 and stators 8. Each stator 8 may be the above stator 8 according to Embodiment 3. This rotating electric machine 9 is of an axial gap type in which the rotor 90 and the stators 8 oppose each other in the axial direction. The rotating electric machine 9 can be used in a motor or a generator. FIG. 12 shows, as an example, the rotating electric machine 9 of a single-rotor double-stator type in which one rotor 90 is assembled so as to be sandwiched by two stators 8. Alternatively, for example, a mode of providing one rotor and one stator or a mode in which one stator is assembled so as to be sandwiched by two rotors may be employed. The rotating electric machine 9 includes a case 92.

The case 92 has a cylindrical internal space, in which the stators 8 and the rotor 90 are accommodated. The case 92 includes a cylindrical portion 921 and two plates 923.

The cylindrical portion 921 surrounds the outer circumference of the stators 8 and the rotor 90. The plates 923 are arranged on respective sides of the cylindrical portion 921. It is preferable that the cylindrical portion 921 has positioning portions for positioning the stators 8. The positioning portions are constituted by protruding portions 922 that protrude from an inner face of the cylindrical portion 921, and engage with the cutout portions 35 of the yoke 3 of the core 1. This engagement allows the stators 8 to be positioned with respect to the case 92.

The two plates 923 are fixed to respective end faces of the cylindrical portion 921 so as to sandwich the stators 8 and the rotor 90 from the respective sides in the axial direction. Each of the two plates 923 has an open hole at the center. A bearing 93 is provided in the open hole, and the rotating shaft 91 is inserted therein via the bearing 93. A bearing is also provided in the shaft hole 39 in the yoke 3, and the rotating shaft 91 is inserted thereto via this bearing. The bearing provided in the shaft hole 39 is not shown in the diagrams. The rotating shaft 91 passes through the inside of the case 92.

The rotor 90 includes a plurality of magnets 95 and a rotor body. The rotor 90 is a flat plate-shaped member. The magnets 95 are, for example, flat plates that have a flat plate shape corresponding to the flat plate shape of the end faces of the teeth 2. The rotor body supports the plurality of magnets 95. The rotor body is an annular member and is rotatably supported by the rotating shaft 91. The magnets 95 are arranged at equal intervals in the circumferential direction of the rotor body. The magnets 95 are magnetized in the axial direction of the rotating shaft 91. The magnetizing directions of magnets 95 adjacent in the circumferential direction of the rotor body are opposite to each other. When the rotor body rotates, the magnets 95 also rotate together with the rotor body.

The stators 8 are arranged such that the end faces of the teeth 2 oppose the magnets 95 of the rotor 90. When the rotor 90 rotates, the end faces of the teeth 2 receive magnetic flux from the rotating magnets 95.

[Effects]

Since the rotating electric machine 9 according to Embodiment 4 includes the stator 8 according to Embodiment 3, the rotating electric machine 9 has excellent magnetic characteristics and productivity.

Test Example 1

Evaluation was made of a difference in the value of the maximum stress (MPa) generated in the first lower punch 55 during compression molding between when the first lower punch 55 has the protruding portions 554 shown in FIGS. 9 and 10 (FIG. 6 is also referred to as appropriate) and when the first lower punch 55 does not have the protruding portions 554.

[Sample No. 1]

In sample No. 1, the core 1 according to Embodiment 2 described with reference to FIGS. 7 and 8 was manufactured using the mold 5 described with reference to FIGS. 9 and 10. That is to say, the first lower punch 55 includes the protruding portions 554 and the recessed portions 555 (FIGS. 9 and 10). Each protruding portion 554 is provided continuously over the perimeter in the circumferential direction of the inner-circumferential face of the corresponding second hole portion 552. The shape of the protruding portions 554 is a trapezoidal ring shape. The recessed portions 555 are provided on the outer-circumferential face of the first lower punch 55. The shape of the recessed portions 555 is a trapezoidal shape.

The shortest distance between the outer-circumferential edge of the upper end face 553 of the first lower punch 55 and the inner-circumferential face of each second hole portion 552 is the distance at the position between a corner portion of the recessed portion 555 and a corner portion of the inner-circumferential face of the second hole portions 552. Corner portions of the inner-circumferential face of each second hole portion 552 are a connection portion between the first region and the outer-circumferential region of the second hole portion 552 and a connection portion between the second region and the outer-circumferential region. The shortest distance between the inner-circumferential edge of the upper end face 553 of the first lower punch 55 and the inner-circumferential face of each second hole portion 552 is the distance at the position of a portion at which the second hole portion 552 is halved in the circumferential direction by a line segment extending along the radial direction. The length of the shortest distance between the outer-circumferential edge of the upper end face 553 of the first lower punch 55 and the inner-circumferential face of each second hole portion 552 was about 2.7 mm. The length of the shortest distance between the inner-circumferential edge of the upper end face 553 of the first lower punch 55 and the inner-circumferential face of each second hole portion 552 was 3 mm.

Figure 7:
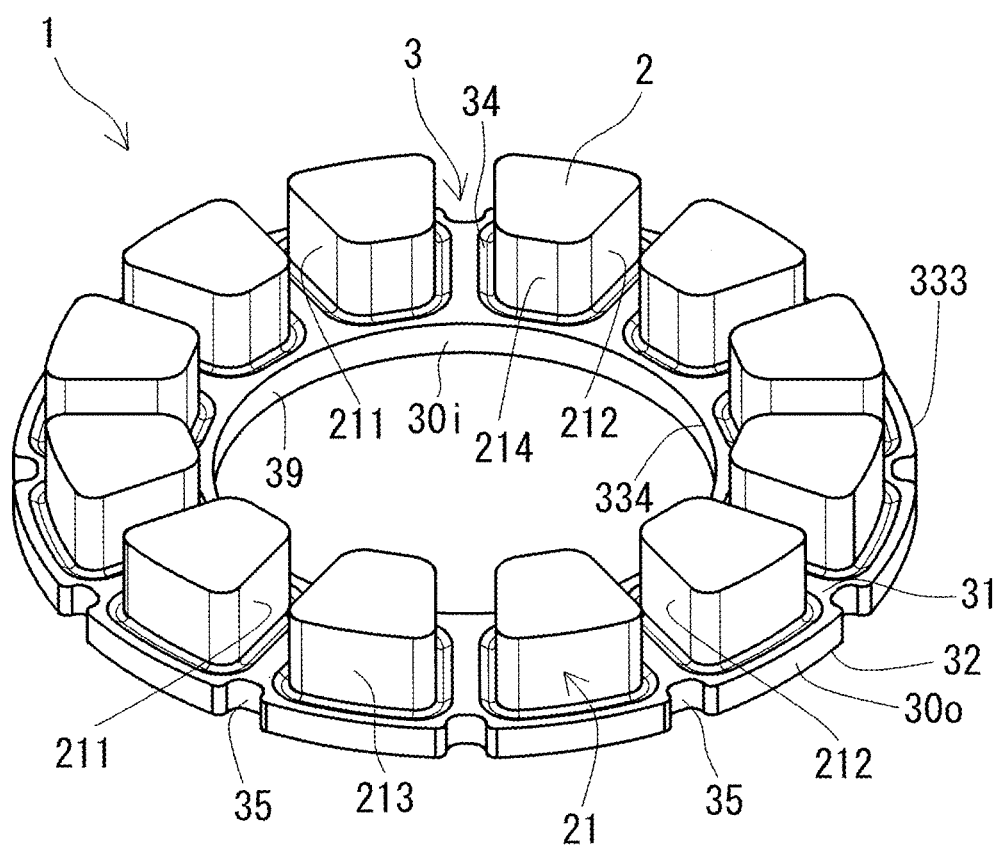
FIG. 7 is a perspective view showing a schematic sketch of a core according to Embodiment 2.

The manufactured core 1 of sample No. 1 has an annular plate-shaped yoke 3 and a plurality of teeth 2 that are integrally molded (FIGS. 7 and 8). The yoke 3 has a plurality of recessed portions 34 and a plurality of cutout portions 35. Each recessed portion 34 is provided continuously with the perimeter of the outer-circumferential face 21 of the corresponding tooth 2. Each cutout portion 35 is provided at a portion of the outer-circumferential face 30*o* of the yoke 3 that corresponds to a portion between adjacent teeth 2. The shortest distance L1 between the outer-circumferential edge 333 of the first face 31 of the yoke 3 and the outer-circumferential face 21 of each tooth 2 is the distance at the position between a corner portion of the cutout portion 35 and a corner portion of the outer-circumferential face 21 of the tooth 2. Corner portions of the outer-circumferential face 21 of the tooth 2 are a connection portion between the outer-circumferential region 213 and the first region 211 and a connection portion between the outer-circumferential region 213 and the second region 212. The shortest distance L2 between the inner-circumferential edge 334 of the first face 31 of the yoke 3 and the outer-circumferential face 21 of each tooth 2 is the distance at the position of a portion at which the tooth 2 is halved in the circumferential direction by a line segment extending along the radial direction. The length of the shortest distance L1 on the outer-circumferential side is about 2.7 mm. The length of the shortest distance L2 on the inner-circumferential side is 3 mm.

[Sample No. 101]

Figure 13:
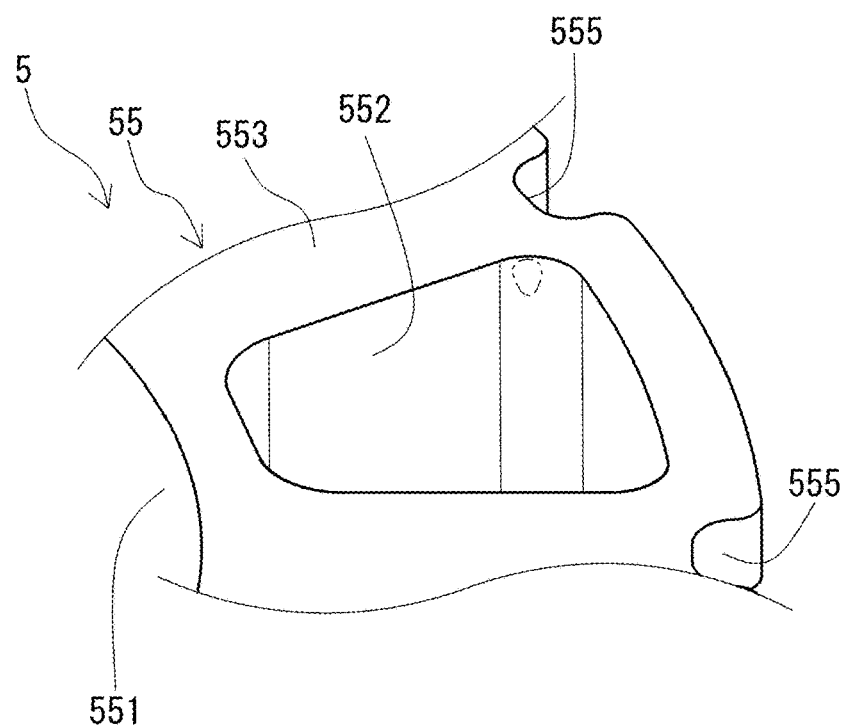
FIG. 13 is a perspective view showing a schematic sketch of a first lower punch provided in a mold for molding a core of sample No. 101.

In sample No. 101, the same core as sample No. 1 was manufactured, except that the yoke is not provided with the recessed portions connected to the outer-circumferential faces of the respective teeth. As shown in FIG. 13, the first lower punch 55 of the mold 5 used to manufacture the core of sample No. 101 is not provided with protruding portions that are connected to the inner-circumferential faces of the respective second hole portions 552, and the upper end face 553 has a flat plate shape.

The manufactured core of sample No. 101 is the same as the core 1 of sample No. 1 except that the yoke is not provided with the recessed portions connected to the outer-circumferential faces of the respective teeth. That is to say, the shortest distance L1 on the outer-circumferential side and the shortest distance L2 on the inner-circumferential side in the core of sample No. 101 are the distances at the same as those of the core 1 of sample No. 1, and have the same lengths as those of the core 1 of sample No. 101.

[Stress Analysis]

When the core 1 of sample No. 1 and the core of sample No. 101 were manufactured, a distribution of stress that acts on the first lower punch 55 was analyzed by means of CAE (Computer Aided Engineering). The value of the maximum stress (MPa) generated in the first lower punch 55 was calculated based on the analysis results obtained through CAE.

In the first lower punch 55 of sample No. 1, the maximum stress acted on a small region near a corner portion of the first lower punch 55 on the outer-circumferential face side in the inner-circumferential face of the second hole portion 552, as indicated by a double-dot dash line circle in FIG. 10. The value of the maximum stress was about 936 MPa.

In contrast, in the first lower punch 55 of sample No. 101, the maximum stress was generated in a relatively large region near a corner portion of the first lower punch 55 on the outer-circumferential face side in the inner-circumferential face of the second hole portion 552, as indicated by a double-dot dash line circle in FIG. 13. The value of the maximum stress was about 1205 MPa.

It was understood that the first lower punch 55 of sample No. 1 can reduce the maximum stress by 20% or more compared with the first lower punch 55 of sample No. 101. That is to say, the first lower punch 55 of sample No. 1 is less likely to deform or be damaged compared with sample No. 101 even if the molding pressure is increased. Accordingly, the first lower punch 55 of sample No. 1 makes it possible to productively manufacture a high-density core 1 with a large proportion of the size of the teeth 2 to the size of the yoke 3.

The present invention is defined by the terms of the claims, but not limited to the above description, and is intended to include any modifications within the meaning and scope equivalent to the terms of the claims.

LIST OF REFERENCE NUMERALS

1 Core
2 Tooth
   21 Outer-circumferential face
      211 First region
      212 Second region
      213 Outer-circumferential region
      214 Inner-circumferential region
3 Yoke
   30o Outer-circumferential face
   30i Inner-circumferential face
   31 First face
   32 Second face
   333 Outer-circumferential edge
   334 Inner-circumferential edge
   34 Recessed portion
      341 Inclined face
      342 Curved face
   35 Cutout portion
   39 Shaft hole
5 Mold
   51 Die
      511 Die hole
      512 Protruding portion
   52 Core rod
      521 Outer-circumferential face
   53 Upper punch
      531 Lower end face
      532 Insertion hole
   54 Lower punch
   55 First lower punch
      551 First hole portion
      552 Second hole portion
      553 Upper end face
      554 Protruding portion
      555 Recessed portion
   56 Second lower punch
      561 Upper end face
8 Stator
   80 Coil
9 Rotating electric machine
   90 Rotor
   91 Rotating shaft
   92 Case
      921 Cylindrical portion
      922 Protruding portion
      923 Plate
   93 Bearing
   95 Magnet
L1, L2 Shortest distance
D Depth
Wd Width
R Curvature radius
Ty Thickness
Wy Length
Ht Height

The invention claimed is:

1. A core for use in an axial gap rotating electric machine, the core comprising:
   a yoke having an annular plate shape; and
   a plurality of teeth having a columnar shape arranged at intervals in a circumferential direction of the yoke,
   wherein the yoke has:
      an outer-circumferential face;
      an inner-circumferential face;
      a first face having a flat shape connecting the outer-circumferential face and the inner-circumferential face to each other; and
      a plurality of recessed portions connected to the first face,
   each of the plurality of teeth has an outer-circumferential face protruding in an axial direction of the yoke with respect to the first face,
   each of the plurality of recessed portions are connected to at least a portion of each one of the plurality of teeth in a circumferential direction of the outer-circumferential face,
   all shortest distances between at least one of an outer-circumferential edge of the first face and an inner-circumferential edge of the first face and the outer-circumferential faces of the plurality of teeth are 4 mm or less, and
   the yoke and the plurality of teeth are made of an integrally-molded powder compact.

2. The core according to claim 1,
   wherein the outer-circumferential face of each of the plurality of teeth has:
      a first region facing the outer-circumferential face of one of the teeth that is adjacent thereto on one side in the circumferential direction of the yoke; and
      a second region facing the outer-circumferential face of one of the teeth that is adjacent thereto on another side in the circumferential direction of the yoke, and
   each of the plurality of recessed portions has a portion connected to the first region and a portion connected to the second region.

3. The core according to claim 1,
   wherein each of the plurality of recessed portions is connected to a perimeter in the circumferential direction of the outer-circumferential face of each one of the plurality of teeth.

4. The core according to claim 1,
   wherein each of the plurality of recessed portions has an inclined face that becomes deeper as the inclined face approaches, from the first face, the outer-circumferential face of each one of the plurality of teeth.

5. The core according to claim 1,
   wherein a relative density of the powder compact is 90% or more.

6. The core according to claim 1,
   wherein the powder compact is made of soft magnetic powder, and
   the soft magnetic powder has a plurality of iron-based particles made of at least one type of metal selected from a group consisting of pure iron, Fe—Si alloys, and Fe—Al alloys.

7. A stator of an axial gap rotating electric machine, the stator comprising:
   the core according to claim 1; and
   a coil arranged on each of the plurality of teeth of the core.

8. An axial gap rotating electric machine that includes a rotor and a stator, the rotor and the stator being arranged opposite to each other in an axial direction,
   wherein the stator is the stator according to claim 7.

9. The core according to claim 1,
   wherein the yoke has a cutout portion provided on at least one of the outer-circumferential face side and the inner-circumferential face side of the yoke with respect to the teeth, and
   the cutout portion is open in at least one of the outer-circumferential face and the inner-circumferential face of the yoke.

10. The core according to claim 9,
    wherein the cutout portion is open at a portion corresponding to a portion between adjacent ones of the teeth in at least one of the outer-circumferential face and the inner-circumferential face of the yoke.

11. The core according to claim 9,
    wherein a length of the cutout portion in the circumferential direction of the yoke is 1.0 mm or more and 10 mm or less.

12. The core according to claim 9,
    wherein a length of the cutout portion in a radial direction of the yoke is 0.5 mm or more and 5 mm or less.

* * * * *